(12) United States Patent
Kaneko et al.

(10) Patent No.: US 9,041,231 B2
(45) Date of Patent: May 26, 2015

(54) POWER GENERATION APPARATUS AND SWITCH

(75) Inventors: Toshio Kaneko, Tokyo (JP); Nobutaka Tsuneyoshi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 155 days.

(21) Appl. No.: 13/977,141

(22) PCT Filed: Jan. 11, 2012

(86) PCT No.: PCT/JP2012/050398
§ 371 (c)(1),
(2), (4) Date: Jun. 28, 2013

(87) PCT Pub. No.: WO2012/096314
PCT Pub. Date: Jul. 19, 2012

(65) Prior Publication Data
US 2013/0270092 A1    Oct. 17, 2013

(30) Foreign Application Priority Data

Jan. 12, 2011   (JP) ................. 2011-004087

(51) Int. Cl.
*F02B 63/04*   (2006.01)
*H01H 15/02*   (2006.01)
(Continued)

(52) U.S. Cl.
CPC ............... *H01H 15/02* (2013.01); *H02K 7/06* (2013.01); *H02K 7/1853* (2013.01); *H01H 23/16* (2013.01); *H01H 2239/076* (2013.01)

(58) Field of Classification Search
USPC ........................... 290/1 E; 200/501; 310/80

IPC ..... H02K 7/1853; Y02B 70/3241,90/224; H01H 2300/03, 9/168; Y04S 20/14, 20/227
See application file for complete search history.

(56) References Cited

U.S. PATENT DOCUMENTS 6,861,785 B2 *   3/2005   Andre et al. ................. 310/339
6,960,852 B2 *   11/2005  Schwarzli ................... 310/75 R
(Continued)

FOREIGN PATENT DOCUMENTS

JP   52-012807   1/1977
JP   56-056144   5/1981
(Continued)

OTHER PUBLICATIONS

International Search Report mailed on Apr. 10, 2012.

*Primary Examiner* — Vanessa Girardi
(74) *Attorney, Agent, or Firm* — IPUSA, PLLC

(57) ABSTRACT

A power generation apparatus includes an operation member that has a first operation part or a second operation part operated upon power generation; a power generation part that generates an induced electromotive force upon being driven by a slide member that moves in a first direction or a second direction; first and second elastic units that accumulate an elastic force; a first connection release mechanism that prompts the first elastic unit to accumulate elastic force when the first operation part is operated and allows the elastic force to be output to move the slide member in the second direction when accumulation is completed; and a second connection release mechanism that prompts the second elastic unit to accumulate the elastic force when the second operation part is operated and allows the elastic force to be output to move the slide member in the first direction when accumulation is completed.

6 Claims, 17 Drawing Sheets

(51) Int. Cl.
  *H02K 7/18* (2006.01)
  *H01H 23/16* (2006.01)
  *H02K 7/06* (2006.01)

(56) References Cited

U.S. PATENT DOCUMENTS 7,988,319 B2 * 8/2011 Liao ............................ 362/192
8,624,447 B2 * 1/2014 Cartier Millon et al. ....... 310/15
8,907,507 B2 * 12/2014 Tsuneyoshi ................. 290/1 E
2003/0143963 A1 7/2003 Pistor et al.
2013/0270943 A1 * 10/2013 Tsuneyoshi et al. ............ 310/80
2014/0191592 A1 * 7/2014 Erdmann et al. ............... 307/143
2014/0353135 A1 * 12/2014 Erdmann et al. ............... 200/518

FOREIGN PATENT DOCUMENTS

JP 2003-164109 6/2003
JP 2003-534704 11/2003

* cited by examiner

POWER GENERATION APPARATUS AND SWITCH

TECHNICAL FIELD

The present invention relates generally to a power generation apparatus and a switch, and particularly to a power generation apparatus that generates power through operation of a switch lever and a switch using such a power generation apparatus.

BACKGROUND ART

Wireless switches are conventionally used as switches for turning ON/OFF electrical appliances such as lights. Wireless switches are more convenient compared to fixed switches because they may be kept close at hand.

A dry-cell battery may be used as the power source of such a wireless switch, for example. However, in such a case, replacing the dry-cell battery may be troublesome and usability of the wireless switch may therefore be compromised. Accordingly, technology for improving the usability of a wireless switch by providing a power generation apparatus within the wireless switch has been proposed (See Japanese Laid-Open Patent Publication No. 2003-534704).

The conventional power generation apparatus is only configured to respond to a single input operation. Thus, in a wireless switch that responds to a plurality of input operations (e.g., ON operation and OFF operation), a power generation apparatus for the ON operation and a power generation apparatus for the OFF operation have to be provided. As a result, in a switch using the conventional power generation apparatus, the configuration may be complicated and manufacturing costs may be increased.

SUMMARY OF THE INVENTION

Means for Solving the Problem

It is a general object of the present invention to provide an improved power generation apparatus and switch that can substantially obviate one or more problems caused by the limitations and disadvantages of the related art.

One specific object of at least one embodiment of the present invention is to provide a simple and inexpensive power generation apparatus and switch that are capable of identifying a plurality of switching operations.

According to one embodiment of the present invention, a power generation apparatus includes a case; an operation member including a first operation part and a second operation part, one of which first operation part or second operation part is operated upon power generation; a power generation part that generates an induced electromotive force when a driven part is driven; a slide member that is arranged at the case and is movable in a first direction and a second direction that is different from the first direction, the slide member being configured to drive the driven part by moving in the first direction or the second direction; and a first elastic unit and a second elastic unit that are configured to accumulate an elastic force upon application of an external force, output the accumulated elastic force, and urge the slide member to move. The power generation apparatus further includes a first connection release mechanism that prompts the first elastic unit to accumulate the elastic force by prompting the slide member to move in the first direction when the first operation part of the operation member is operated, releases a connection between the operation member and the slide member when the operation member passes a first accumulation completed position, and allows the first elastic unit to output the accumulated elastic force to prompt the slide member to move in the second direction; and a second connection release mechanism that prompts the second elastic unit to accumulate the elastic force by prompting the slide member to move in the second direction when the second operation part of the operation member is operated, releases the connection between the operation member and the slide member when the operation member passes a second accumulation completed position, and allows the second elastic unit to output the accumulated elastic force to prompt the slide member to move in the first direction.

According to another embodiment of the present invention, a power generation apparatus includes a case; an operation member including a first operation part and a second operation part one of which first operation part or second operation part is operated upon power generation; a detection unit that engages one of the first operation part or the second operation part that has been operated and outputs a detection signal; a power generation part that generates an induced electromotive force when a driven part is driven; a slide member that is arranged at the case and is movable in a first direction and a second direction that is different from the first direction, the slide member being configured to drive the driven part by moving in the first direction or the second direction; and a first elastic unit and a second elastic unit that are configured to accumulate an elastic force upon application of an external force, output the accumulated elastic force, and urge the slide member to move. The power generation apparatus further includes a first connection release mechanism that prompts the first elastic unit to accumulate the elastic force by prompting the slide member to move in the first direction when the first operation part of the operation member is operated, releases a connection between the operation member and the slide member when the operation member passes a first accumulation completed position, and allows the first elastic unit to output the accumulated elastic force to prompt the slide member to move in the second direction; and a second connection release mechanism that prompts the second elastic unit to accumulate the elastic force by prompting the slide member to move in the second direction when the second operation part of the operation member is operated, releases the connection between the operation member and the slide member when the operation member passes a second accumulation completed position, and allows the second elastic unit to output the accumulated elastic force to prompt the slide member to move in the first direction.

According to an aspect of the present invention, an operation of the operation member may be easily identified by a simple and inexpensive configuration.

Figure 1:
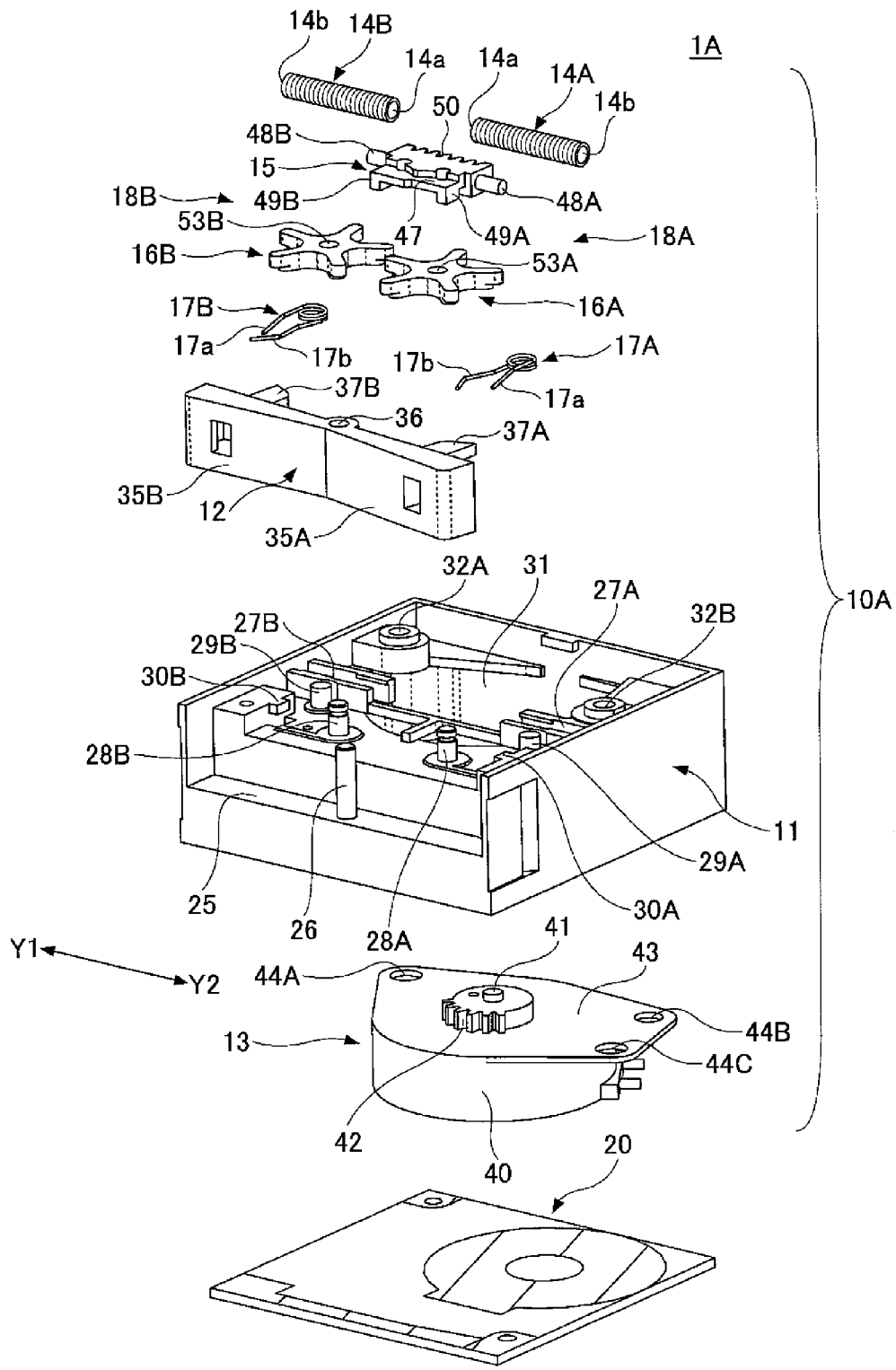
FIG. 1 is an exploded perspective view of a power generation apparatus and a switch according to a first embodiment of the present invention.
Figure 2:
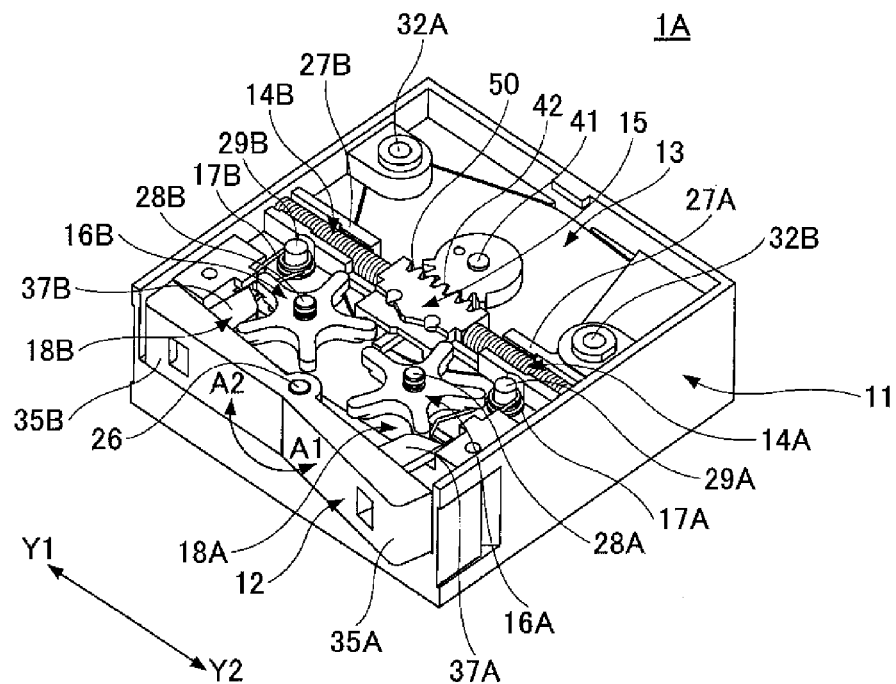
FIG. 2 is a perspective view of the power generation apparatus and switch of the first embodiment as seen from above.

DESCRIPTION OF THE REFERENCE NUMERALS 1A, 1B switch
10A, 10B power generation apparatus
11 case
12, 112 switch lever
13 power generator
14A first power generation spring
14B second power generation spring
15 slide member
16A first pinwheel
16B second pinwheel
17A first pinwheel spring
17B second pinwheel spring
18A first connection release mechanism
18B second connection release mechanism
20 circuit board
27 spring mounting part
28A first wheel shaft
28B second wheel shaft
29A first spring mounting shaft
29B second spring mounting shaft
35A, 135A first operation part
35B, 135B second operation part
37A, 137A first engagement convex part
37B, 137B second engagement convex part
40 body
41 driven part
42 gear
48A first connection part
48B second connection part
49A first engagement part
49B second engagement part
50 rack
55A-55E engagement protrusion
56A-56E engagement protrusion
100 detection switch
101 switch knob
137C arm part

EMBODIMENTS FOR IMPLEMENTING THE INVENTION

In the following, embodiments of the present invention are described with reference to the accompanying drawings.

First, a switch 1A and a power generation apparatus 10A according to a first embodiment of the present invention are described below.

FIGS. 1-4 illustrate configurations of the switch 1A and the power generation apparatus 10A of the first embodiment. FIGS. 5-11 illustrate operations of the switch 1A and the power generation apparatus 10A of the first embodiment.

The switch 1A is a wireless switch that includes the power generation apparatus 10A and a circuit board 20. The power generation apparatus 10A is configured to generate power when a switch lever 12 is operated. The circuit board 20 includes a high frequency communication circuit (not shown) and is activated by the power (induced electromotive force) generated by the power generation apparatus 10A.

Figure 3:
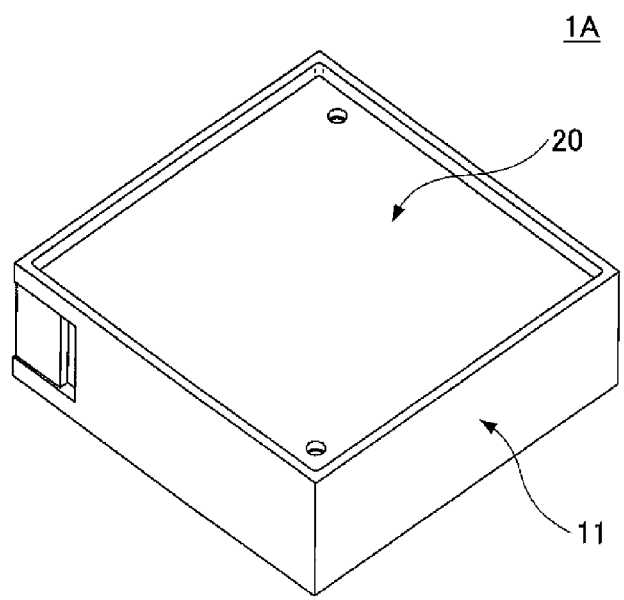
FIG. 3 is a perspective view of the power generation apparatus and switch of the first embodiment as seen from below.
Figure 4:
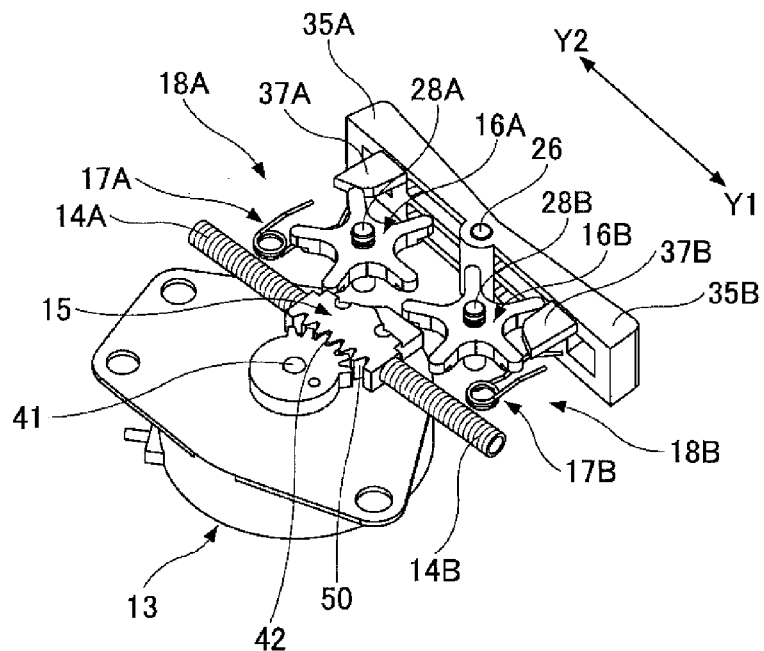
FIG. 4 is partial enlarged view of the power generation apparatus and switch of the first embodiment.

The high frequency communication circuit, when activated, sends a 2.4 GHz switch signal (radio wave) to an electrical appliance (e.g., light). In this way, ON operation and OFF operation of the electrical appliance may be enabled. As illustrated in FIG. 3, the circuit board 20 is arranged at the rear face side of a case 11.

The power generation apparatus lap, includes the case 11, the switch lever 12, a power generator 13, first and second power generation springs 14A and 14B, a slide member 15, and first and second connection release mechanisms 18A and 18B, for example.

The case 11 is a resin molded article that is arranged into a rectangular shape. A lever mounting concave part 25 for mounting the switch lever 12 is fo ued at one side of the case 11. A spindle 26 that axially supports the switch lever 12 is arranged to stand upright at the center of the lever mounting concave part 25.

Also, first and second spring accommodating parts 27A and 27B for mounting the power generation springs 14A and 14B, first and second spring mounting shafts 29A and 29B for mounting first and second pinwheel springs 17A and 17B, spring engagement parts 30A and 30B that engage ends 17a of the pinwheel springs 17A and 17B, an opening part 31 for mounting the power generator 13, and bosses 32A and 32B for attaching the power generator 13 are integrally formed at the case 11.

The switch lever 12 is a resin molded article that includes first and second operation parts 35A and 35B, a shaft hole 36, and first and second engagement convex parts 37A and 37B that are integrally formed. By inserting the shaft hole 26 through the spindle 26, the switch lever 12 may be axially supported by the spindle 26. The switch lever 12 is a see-saw type switch lever that is configured to swing back and forth in the directions indicated by arrow A1-A2 shown in FIGS. 2 and 5. The switch lever 12 is an embodiment of an operation member of the power generation apparatus and switch of the present invention.

The first and second operation parts 35A and 35B of the switch lever 12 correspond to parts that are operated by an operator. Because the switch lever 12 of the present embodiment is configured to swing back and forth in the A1 and A2 directions with respect to the spindle 26 as a pivot, two operations including a first operation of operating the first operation part 35A and a second operation of operating the second operation part 35B may be implemented using the switch lever 12.

The first and second engagement convex parts 37A and 37B are formed at the rear face side of the switch lever 12. The first engagement convex part 37A is arranged to protrude at the opposite side of the first operation part 35A, and the second engagement convex part 37B is arranged to protrude at the opposite side of the second operation part 35B.

The power generator 13 is configured to generate power when the first and second operation parts 35A and 35B are operated. The voltage characteristics of the power generated by the power generator 13 when the first operation part 35A is operated is different from the voltage characteristics of the power generated by the power generator 13 when the second operation part 353 is operated. In this way, the first operation and the second operation may be distinguished from one another. It is noted that this aspect is described in greater detail below.

Next, the power generator 13 is described. The power generator 13 is an embodiment of a power generation part of the power generation apparatus and switch of the present invention. The power generator 13 includes a substrate 43 that is made of metal and a body 40.

The power generator 13 also includes a driven part 41 (rotation shaft) that protrudes upward from the substrate 43. The power generator 13 is a motor power generator that is configured to generate power by rotating the driven part 41 so that a magnet inside a coil that is arranged within the power generator 13 rotates to generate an induced electromotive force.

The substrate 43 includes a plurality of mounting holes 44A-44C. To fix the power generator 13 to the case 11, screws (not shown) are inserted through the mounting holes 44A-44C and the screws are threaded into corresponding bosses such as the bosses 32A and 323. Also, the case 11 has the opening part 31 formed at region where the power generator 13 is mounted. Thus, when the power generator 13 is mounted and fixed to the case 11, the driven part 41 may be positioned within the opening part 31. Further, as is described in detail below, a gear 42 that engages a rack 50 is fixed to the driven part 41.

The first and second power generation springs 14A and 14B are embodiments of first and second elastic units of the power generation apparatus and switch of the present invention. The first power generation spring 14A is mounted to the first spring accommodating part 27A that is arranged at the case 11, and the second power generation spring 14B is mounted to the second spring accommodating part 27B that is arranged at the case 11. The first and second power generation springs 14A and 14B are arranged at opposite sides of the slide member 15, which is described below.

The first and second power generation springs 14A and 14B have inner side ends 14a that are attached to the slide member 15 and outer side ends 14b that are arranged to be in contact with the inner wall of the case 11. Also, upon being compressed, the first and second power generation springs 14A and 14B are configured to accumulate elastic force and output the accumulated elastic force so that the driven part 41 of the power generator 13 may be rotated to generate an induced electromotive force.

It is noted that although coil springs corresponding to compression springs are used as the first and second power generation springs 14A and 14B in the present embodiment, other types of springs, elastic members such as rubber, air cylinders, and the like that are capable of accumulating a predetermined elastic force (elastic energy) may be used in alternative embodiments.

The slide member 15 is a resin molded article that includes a body part 47, first and second connection parts 48A and 48B, first and second engagement parts 49A and 49B, and the rack 50 that are integrally formed.

The body part 47 has the first engagement part 49A formed at its Y2 direction side end and the second engagement part 49B formed at its Y1 direction side end. The first engagement part 49A is configured to be engageable with a first pinwheel 16A, which is described below. The second engagement part 49B is configured to be engageable with a second pinwheel 16B, which is described below.

Also, the rack 50, which extends in the Y1 and Y2 directions, is formed at the body part 47. The rack 50 is configured to be engageable with the gear 42 that is arranged at the driven part 41 of the power generator 13. In this way, the power generator 13 and the slide member 15 may be interconnected via the gear 42 and the rack 50. Thus, when the slide member 15 moves in the Y1 direction or the Y2 direction, the slide member 15 causes the driven part 41 to rotate via the rack 50 and the gear 42, and in this way, the power generator 13 generates an induced electromotive force.

The rack 50 has the first connection part 48A formed at its Y2 direction side end and the second connection part 48B formed at its Y1 direction side end. The first connection part 48A is fit into end 14a of the first power generation spring 14A. In this way, the slide member 15 and the first power generation spring 14A may be interconnected.

The second connection part 48B is fit into end 14a of the second power generation spring 14B. In this way, the slide member 15 and the second power generation spring 14B may be interconnected. That is, the first and second connection parts 48A and 48B are connected to the first and second power generation springs 14A and 14B, respectively, and the slide member 15 is arranged between the first power generation spring 14A and the second power generation spring 14B.

Because the slide member 15 is arranged between the first and second power generation springs 14A and 14B, when the slide member 15 moves in the Y1 direction, the second power generation spring 14B is compressed to thereby accumulate elastic force. On the other hand, when the slide member 15 moves in the Y2 direction, the first power generation spring 14A is compressed to thereby accumulate elastic force.

When the elastic force accumulated at the first power generation spring 14A is output, the slide member 15 instantaneously moves in the Y1 direction, and as a result, the driven part 41 is urged to rotate via the rack 50 and the gear 42 to cause the power generator 13 to generate an induced electromotive force. When the elastic force accumulated at the second power generation spring 14B is output, the slide member 15 instantaneously moves in the Y2 direction, and as a result, the driven part 41 is urged to rotate via the rack 50 and the gear 42 to cause the power generator 13 to generate an induced electromotive force.

The direction in which the slide member 15 moves when the elastic force accumulated at the first power generation spring 14A is output is opposite the direction in which the slide member 15 moves when the elastic force accumulated at the second power generation spring 14B is output. Accordingly, the rotating direction of the driven part 41 upon being urged by the slide member 15 when the elastic force accumulated at the first power generation spring 14A is output is opposite the rotating direction of the driven part 41 when the elastic force accumulated at the second power generation spring 14B is output.

Next, the first and second connection release mechanisms 18A and 18B are described. The first connection release mechanism 18A includes the first pinwheel 16A and the first pinwheel spring 17A. The first connection release mechanism 18A is configured to connect the switch lever 12 (via the first engagement convex part 37A) to the slide member 15 and release (unlock) the connection between the switch lever 12 and the slide member 15.

The second connection release mechanism 18B includes the second pinwheel 16B and the second pinwheel spring 17B. The second connection release mechanism 18B is configured to connect the switch lever 12 (via the second engagement convex part 37B) to the slide member 15 and release (unlock) the connection between the switch lever 12 and the slide member 15.

Next, configurations of the first and second pinwheels 16A and 16B are described.

The first and second pinwheels 16A and 16B are resin molded articles. The first pinwheel 16A has a plurality of (five in the present embodiment) engagement protrusions 55A-55E extending in radial directions. Also, the first pinwheel 16A has a shaft hole 53A formed at its center, and this shaft hole 53A is inserted through a first wheel shaft 28A that is formed at the case 11.

Similarly, the second pinwheel 16B has a plurality of (five in the present embodiment) engagement protrusions 56A-56E extending in radial directions. Also, the second pinwheel 162 has a shaft hole 53B formed at its center, and this shaft hole 532 is inserted through a second wheel shaft 28B that is formed at the case 11. In this way, the first and second pinwheels 16A and 16B are rotatably mounted to the case 11.

When the switch lever 12 is operated in the A1 direction, one of the engagement protrusions 55A-55E of the first pinwheel 16A (the engagement protrusion 55A in the example illustrated in FIG. 5) engages the first engagement convex part 37A, and another one of the engagement protrusions 55A-55E (the engagement protrusion 55D in the example illustrated in FIG. 5) engages the first engagement part 49A of the slide member 15. Thus, when the switch lever 12 is operated in the A1 direction, the switch lever 12 is connected to the second power generation spring 14B (corresponding to an embodiment of the first elastic unit of the present invention) via the first pinwheel 16A and the slide member 15.

On the other hand, when the switch lever 12 is operated in the A2 direction, one of the engagement protrusions 56A-56E of the first pinwheel 16A (the engagement protrusion 56A in the example illustrated in FIG. 9) engages the second engagement convex part 37B, and another one of the engagement protrusions 56A-56E (the engagement protrusion 56D in the example illustrated in FIG. 9) engages the second engagement part 49B of the slide member 15. Thus, when the switch lever 12 is operated in the A2 direction, the switch lever 12 is connected to the first power generation spring 14A (corresponding to an embodiment of the second elastic unit of the present invention) via the second pinwheel 16B and the slide member 15.

The first and second pinwheel springs 17A and 17B are torsion springs that are arranged near the first and second pinwheels 16A and 16B. Specifically, the first pinwheel spring 17A is mounted to the first spring mounting shaft 29A, the end 17a of the first pinwheel spring 17A is arranged to engage the spring engagement part 30A of the case 11, and the other end 17b of the first pinwheel spring 17A is arranged to engage the first pinwheel 16A. The first pinwheel spring 17A is configured to constantly urge the first pinwheel 16A to rotate in a certain direction (counterclockwise direction in the example illustrated in FIG. 6).

The second pinwheel spring 17B is mounted to the second spring mounting shaft 29B, the end 17a of the second pinwheel spring 17B is arranged to engage the spring engagement part 30B of the case 11, and the other end 17b of the second pinwheel spring 17B is arranged to engage the second pinwheel 16B. The second pinwheel spring 17B is configured to constantly urge the second pinwheel 16B to rotate in a certain direction (clockwise direction in the example illustrated in FIG. 6).

Next, operations of the switch 1A and the power generation apparatus 10A having the above configurations are described below.

Figure 7:
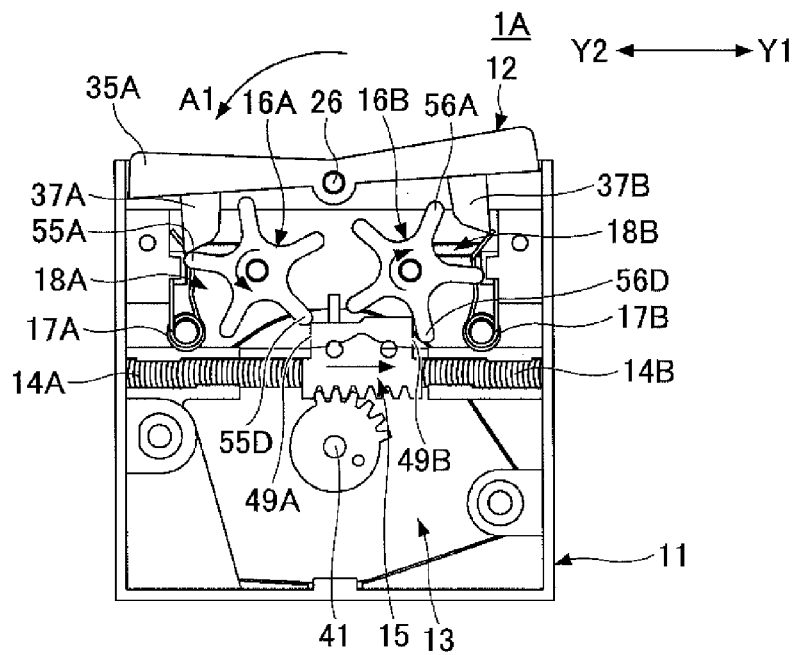
FIG. 7 is a plan view illustrating an operation of the power generation apparatus and switch of the first embodiment.
Figure 8:
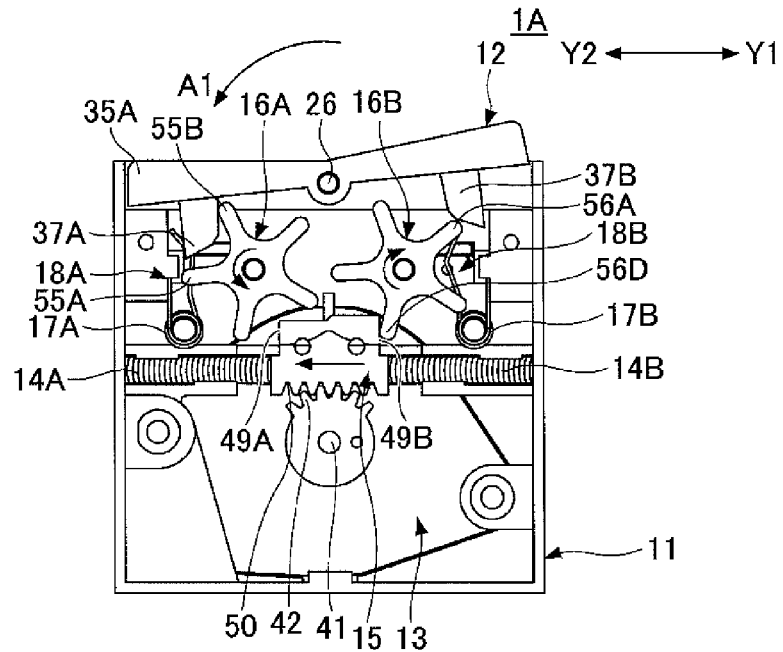
FIG. 8 is a plan view illustrating an operation of the power generation apparatus and switch of the first embodiment.
Figure 9:
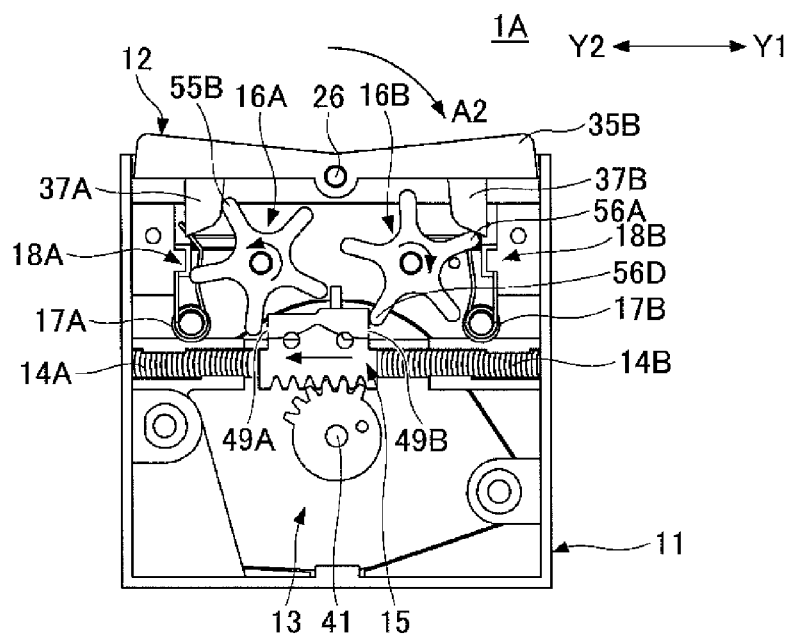
FIG. 9 is a plan view illustrating an operation of the power generation apparatus and switch of the first embodiment.
Figure 10:
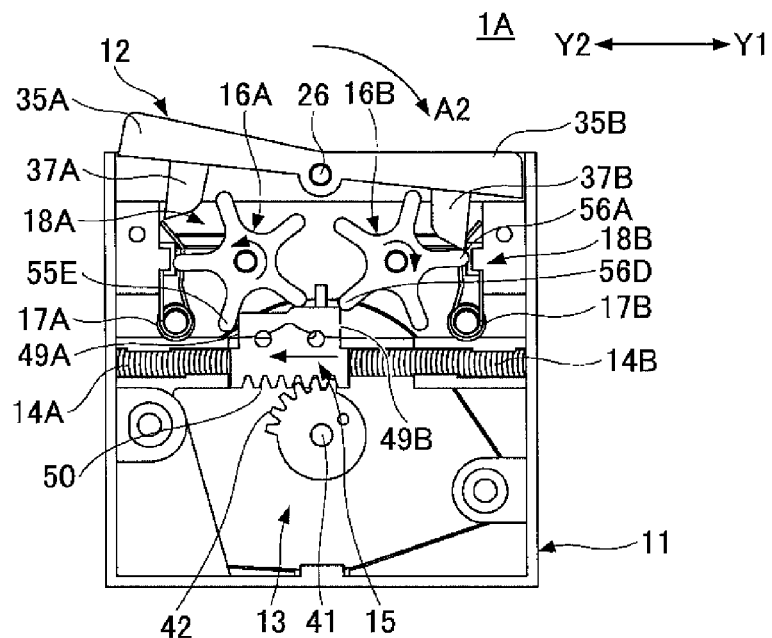
FIG. 10 is a plan view illustrating an operation of the power generation apparatus and switch of the first embodiment.
Figure 11:
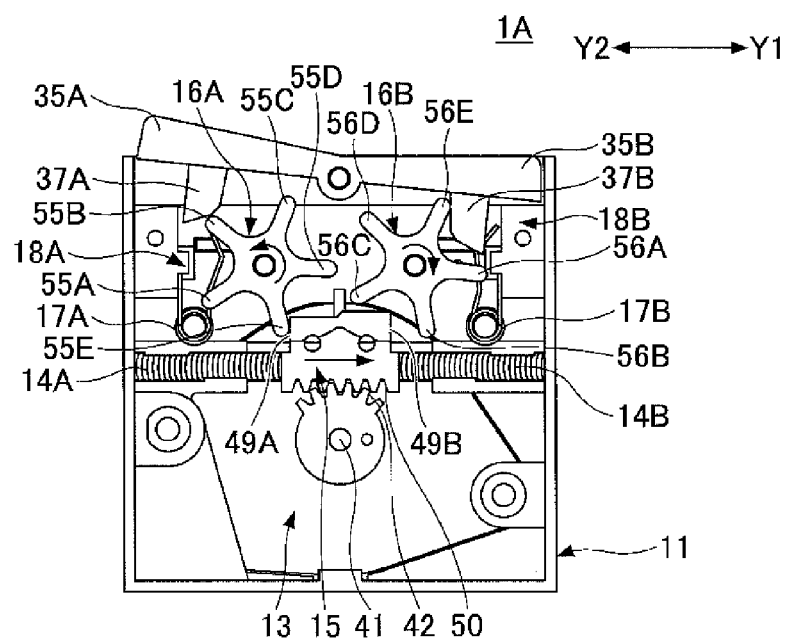
FIG. 11 is a plan view illustrating an operation of the power generation apparatus and switch of the first embodiment.

FIGS. 5-11 illustrate operations of the switch 1A and the power generation apparatus 10A upon power generation. Specifically, FIGS. 5-8 illustrate operations of the switch 1A and the power generation apparatus 10A when the switch lever 12 is operated in the A1 direction, and FIGS. 9-11 illustrate operations of the switch 1A and the power generation apparatus 10A when the switch lever 12 is operated in the A2 direction.

First, referring to FIGS. 5-8, the operations of various elements when the switch lever 12 is operated in the A1 direction are described.

Figure 5:
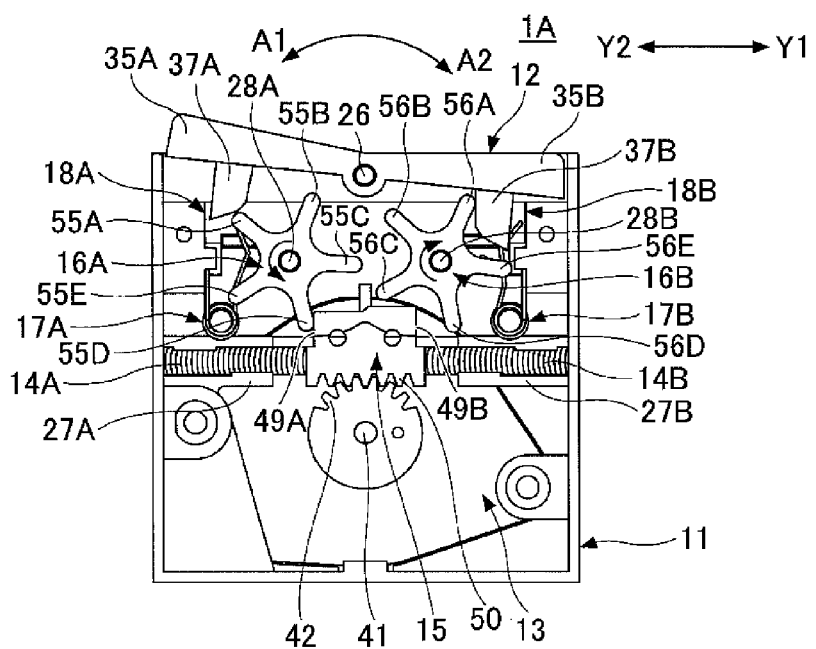
FIG. 5 is a plan view illustrating an operation of the power generation apparatus and switch of the first embodiment.

FIG. 5 illustrates a state of the switch 1A before the switch lever 12 is operated in the A1 direction (referred to as "state before first operation" hereinafter).

In the state before the first operation, the switch lever 12 is disposed toward the A2 direction. Also, the first and second pinwheels 16A and 16B are urged to rotate by the first and second pinwheel springs 17A and 17B. However, because the engagement protrusions 55A and 56A are in engagement with the first and second engagement convex parts 37A and 37B, rotation of the first and second pinwheels 16A and 16B are restricted.

Also, in the state before the first operation, the first and second power generation springs 14A and 14B are elongated so that elastic forces are not accumulated at the first and second power generation springs 14A and 14B at this stage. Thus, the slide member 15 is positioned approximately at a center position (referred to as "pre-operation position" hereinafter) of its movement range.

With regard to the first pinwheel 16A of the first connection release mechanism 18A, the engagement protrusion 55A of the first pinwheel 16A is in engagement with the first engagement convex part 37A of the switch lever 12, and the engagement protrusion 55D is in engagement with the first engagement part 49A of the slide member 15. Thus, the switch lever 12 and the second power generation spring 14B are interconnected via the first connection release mechanism 18A (first pinwheel 16A) and the slide member 15.

Figure 6:
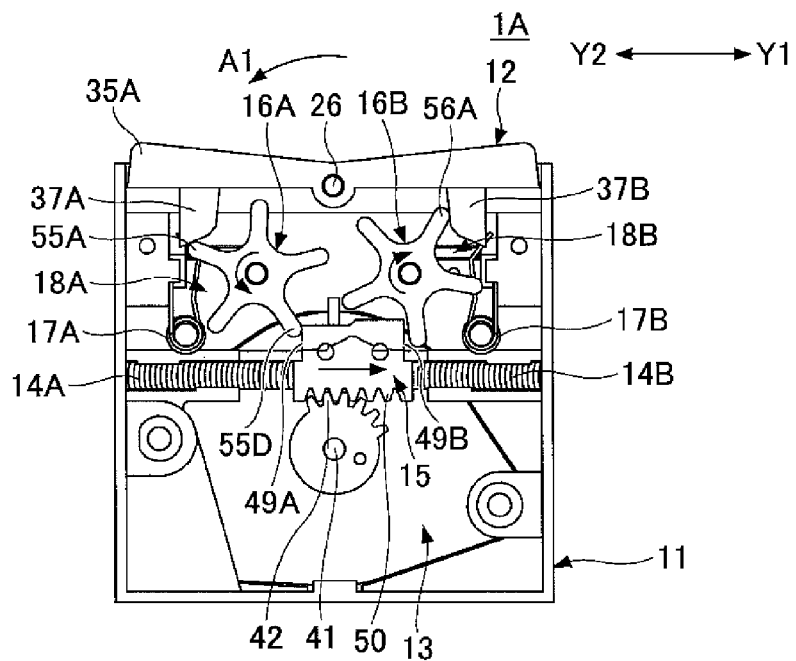
FIG. 6 is a plan view illustrating an operation of the power generation apparatus and switch of the first embodiment.

FIG. 6 illustrates a state of the switch 1A when operation of the switch lever 12A in the A1 direction is started. With this operation, the first engagement convex part 37A pushes the engagement protrusion 55A. Because the first pinwheel 16A is rotatably mounted to the first wheel shaft 28A, the first pinwheel 16A rotates in the counterclockwise direction when the engagement protrusion 55A is pushed by the first engagement convex part 37A.

When the first pinwheel 16A rotates, the engagement protrusion 55D also rotates and thereby urges the first engagement part 49A, which is in engagement with the engagement protrusion 55D, to move in the Y1 direction. In this way, the slide member 15 starts moving toward the Y1 direction from the pre-operation position.

When the slide member 15 slides in the Y1 direction, the second power generation spring 14B, which is arranged at the Y1 direction side of the slide member 15, is also urged in the Y1 direction. However, because the end 14b of the second power generation spring 14B is in contact with the inner wall of the case 11, when the slide member 15 slides in the Y1 direction, the second power generation spring 143 is compressed and thereby accumulates elastic force.

It is noted that when the slide member 15 moves in the Y1 direction, the driven part 41 is also rotated via the rack 50 and the gear 42. However, because the force applied to the slide member 15 upon operation of the switch lever 12 (force applied by an operator) is relatively small and unstable, effective power generation by the power generator 13 is not triggered by such operation.

FIG. 7 illustrates a state of the switch 1A when the switch lever 12 is operated to reach a position at which the second power generation spring 14B accumulates sufficient elastic force for driving the power generator 13 (such position of the switch lever 12 being referred to as "first accumulation completed position" and such state of the switch 1A being referred to as "first accumulation completed state" hereinafter).

In the first accumulation completed state, the switch lever 12 and the first operation part 35A (first engagement convex part 37A) are thrust in the A1 direction and the slide member 15 is disposed at a Y1 direction end position of its movement range.

In the present embodiment, the second power generation spring 14B is compressed to its limit at the first accumulation completed state so that sufficient elastic force for driving the power generator 13 to generate power may be accumulated at the second power generation spring 14B. Also, in the first accumulation completed state, although the engagement protrusion 55D of the first pinwheel 16A is still in engagement with an edge of the first engagement part 49A, the engagement protrusion 55D is on the verge of being disengaged from the first engagement part 49A.

When the switch lever 12 (first engagement convex part 37A) is thrust further in the A1 direction from the first accumulation completed position, the engagement protrusion 55D disengages from the first engagement part 49A and the connection between the switch lever 12 and the second power generation spring 14B is released. When the engagement protrusion 55D disengages from the first engagement part 49A, the elastic force (elastic energy) accumulated at the second power generation spring 14B is applied to the slide member 15 so that the slide member 15 instantaneously moves in the Y2 direction. FIG. 8 illustrates the state of the switch 1A right after the slide member 15 has moved in the Y2 direction.

As described above, the gear 42 is in engagement with the rack 50. Thus, when the slide member 15 instantaneously slides in the Y2 direction, the driven part 41 is rotated in the counterclockwise direction. In this way, the power generator 13 generates an induced electromotive force (generates power) in response to the elastic force output by the second power generation spring 14B.

At the time of such power generation (referred to as "first power generation" hereinafter), because the first pinwheel 16A is disengaged from the slide member 15, only the elastic force (elastic restoring force) accumulated at the second power generation spring 14B is applied to the slide member 15. A sufficiently strong elastic force for driving the power generator 13 to generate power is accumulated at the second power generation spring 14B. Thus, in the first power generation, the power generator 13 is driven by the elastic force accumulated at the second power generation spring 14B to generate an induced electromotive force with a stable and high output power.

Figure 12:
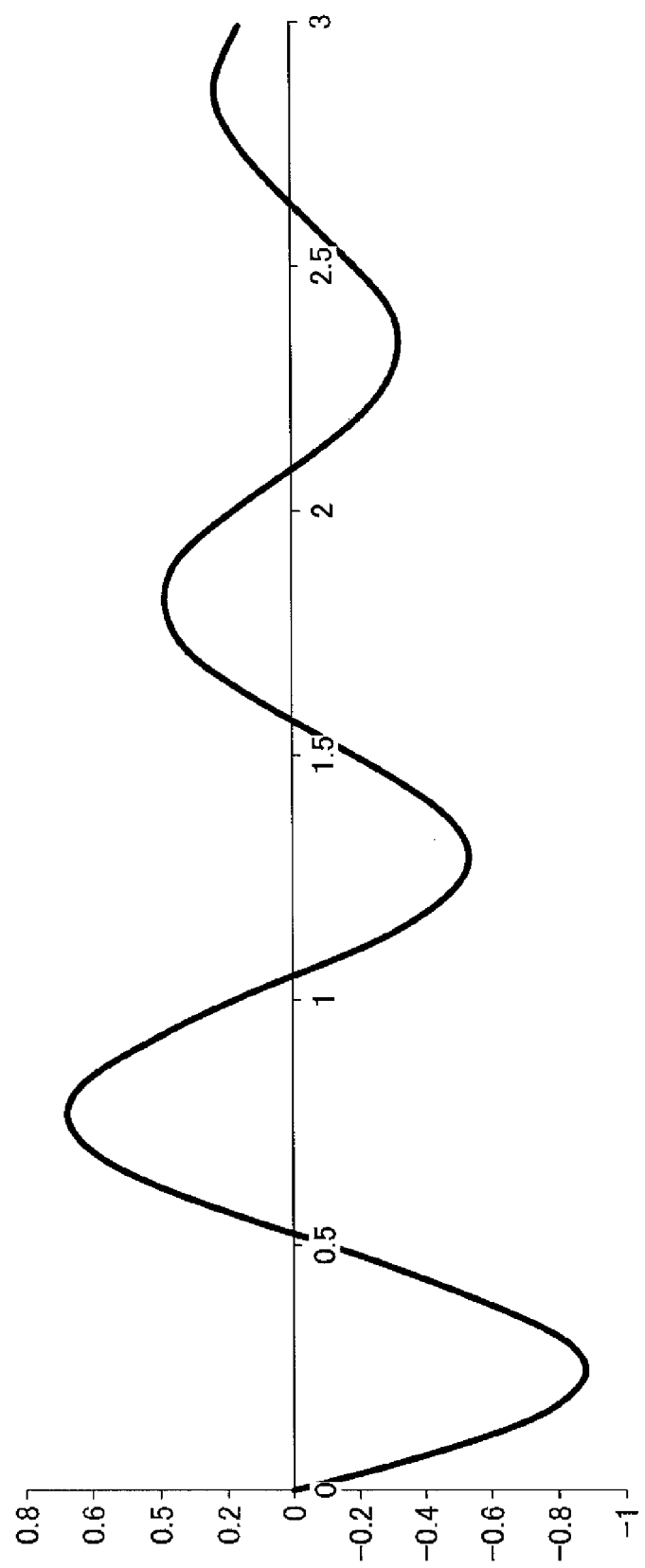
FIG. 12 is a graph indicating a voltage waveform of power generated by a power generator in a first power generation.

FIG. 12 illustrates a voltage waveform of the induced electromotive force output by the power generator 13 in the first power generation. In FIG. 12, the horizontal axis represents the time and the vertical axis represents the voltage. As described above, in the first power generation, the driven part 41 of the power generator 13 rotates in the counterclockwise direction in FIG. 8, and as a result, an induced electromotive force having a damped oscillatory waveform as illustrated in FIG. 12 is generated. That is, as the voltage waveform of the induced electromotive force generated in the first power generation, a negative electromotive force is first generated after which positive and negative electromotive forces are alternately generated.

When the power generator 13 generates the induced electromotive force as described above, the high frequency communication circuit arranged at the circuit board 20 transmits a radio wave to an electrical appliance (not shown). In this way, the first operation (e.g., ON operation) may be implemented with respect to the electrical appliance, for example.

It is noted that when the power generator 13 generates power in response to the operation of the first connection release mechanism 18A, the second pinwheel 16B of the second connection release mechanism 18B is arranged so that it would not interfere with the operations of the switch lever 12 and the slide member 15.

Next, referring to FIGS. 9-11, operations of various elements when the switch lever 12 is operated in the A2 direction are described.

As described above, in the first power generation, the slide member 15 moves in the Y2 direction. Thereafter, the slide member 15 moves back and forth in the Y1 and Y2 directions, and as the back-and-forth movement gradually dampens, the slide member 15 eventually stops approximately at the center position (pre-operation position).

FIG. 8 illustrates a state when the slide member 15 has stopped approximately at the center position with respect to the Y1 and Y2 directions. The state illustrated in FIG. 8 corresponds to a state right before operating the switch lever 12 in the A2 direction (referred to as "state before second operation" hereinafter).

In the state before the second operation, the switch lever 12 is disposed toward the A1 direction. Also, the first and second pinwheels 16A and 16B are urged to rotate by the first and second pinwheel springs 17A and 17B. However, because the engagement protrusions 55B and 56A are in engagement with the first and second engagement convex parts 37A and 37B, rotation of the first and second pinwheels 16A and 16B are restricted. Further, the slide member 15 is positioned at the pre-operation position by the first and second power generation springs 14A and 14B.

Also, in the state before the second operation, the engagement protrusion 56A of the second pinwheel 16B is in engagement with the second engagement convex part 37B of the switch lever 12, and the engagement protrusion 56D is in engagement with the second engagement part 49B of the slide member 15. In this way, the switch lever 12 and the first power generation spring 14A are interconnected via the second connection release mechanism 18B (second pinwheel 16B) and the slide member 15.

When the switch lever 12 is operated in the A2 direction from the state before the second operation, the operation triggers operations that are symmetrical to the above-described operations that are triggered when the switch lever 12 is operated in the A1 direction as described in detail below.

FIG. 9 illustrates a state of the switch 1A when operation of the switch lever 12 in the A2 direction is started. With this operation, the second engagement convex part 37B pushes the engagement protrusion 56A. Because the second pinwheel 16B is rotatably mounted to the second wheel shaft 28B, the second pinwheel 16B rotates in the clockwise direction when the engagement protrusion 56A is pushed by the second engagement convex part 373.

When the second pinwheel 16B rotates, the engagement protrusion 56D also rotates and thereby urges the second engagement part 49B, which is in engagement with the engagement protrusion 56D, to move in the Y2 direction. In this way, the slide member 15 starts moving toward the Y2 direction from the pre-operation position. Also, when the slide member 15 slides in the Y2 direction, the first power generation spring 14A, which is arranged at the Y2 direction side of the slide member 15, is also urged in the Y2 direction. Thus, the first power generation spring 14A is compressed and thereby accumulates elastic force. It is noted that because the force applied to the switch lever 12 by the operator is relatively small and unstable, effective power generation by the power generator 13 is not triggered by the above movement of the slide member 15.

FIG. 10 illustrates a state of the switch 1A when the switch lever 12 is operated to reach a position at which the first power generation spring 14A accumulates sufficient elastic force for driving the power generator 13 (such position of the switch lever 12 being referred to as "second accumulation completed position" and such state of the switch 1A being referred to as "second accumulation completed state" hereinafter). In the second accumulation completed state, the switch lever 12 and the second operation part 35B (second engagement convex part 372) are thrust in the A2 direction and the slide member 15 is disposed at a Y2 direction end position of its movement range.

In the present embodiment, the first power generation spring 14A is compressed to its limit at the second accumulation completed state so that sufficient elastic force for driving the power generator 13 to generate power may be accumulated at the first power generation spring 14A. Also, in the second accumulation completed state, the second pinwheel 16B is on the verge of being disengaged from the second engagement part 49B.

When the switch lever 12 (second engagement convex part 37B) is thrust further in the A2 direction from the second accumulation completed position, the engagement protrusion 56D disengages from the second engagement part 49B and the connection between the switch lever 12 and the first power generation spring 14A is released. When the engagement protrusion 56D disengages from the second engagement part 49B, the elastic force (elastic energy) accumulated at the first power generation spring 14A is applied to the slide member 15 so that the slide member 15 instantaneously moves in the Y1 direction. FIG. 11 illustrates the state of the switch 1A right after the slide member 15 has moved in the Y1 direction.

When the slide member 15 instantaneously slides in the Y1 direction as described above, the driven part 41 is rotated in the clockwise direction. In this way, the power generator 13 generates an induced electromotive force (generates power) in response to the elastic force output by the first power generation spring 14A.

At the time of such power generation (referred to as "second power generation" hereinafter), because the second pinwheel 163 is disengaged from the slide member 15, only the elastic force (elastic restoring force) accumulated at the first power generation spring 14A is applied to the slide member 15. A sufficiently strong elastic force for driving the power generator 13 to generate power is accumulated at the first power generation spring 14A. Thus, in the second power generation, the power generator 13 is driven by the elastic force accumulated at the first power generation spring 14A to generate an induced electromotive force with a stable and high output power.

When the power generator 13 generates the induced electromotive force in the second power generation, the high frequency communication circuit arranged at the circuit board 20 transmits a radio wave to an electrical appliance (not shown). In this way, the second operation (e.g., OFF operation) may be performed with respect to the electrical appliance, for example.

It is noted that when the power generator 13 generates power in response to the operation of the second connection release mechanism 18B, the first pinwheel 16A of the first connection release mechanism 18A is arranged so that it would not interfere with the operations of the switch lever 12 and the slide member 15.

Figure 13:
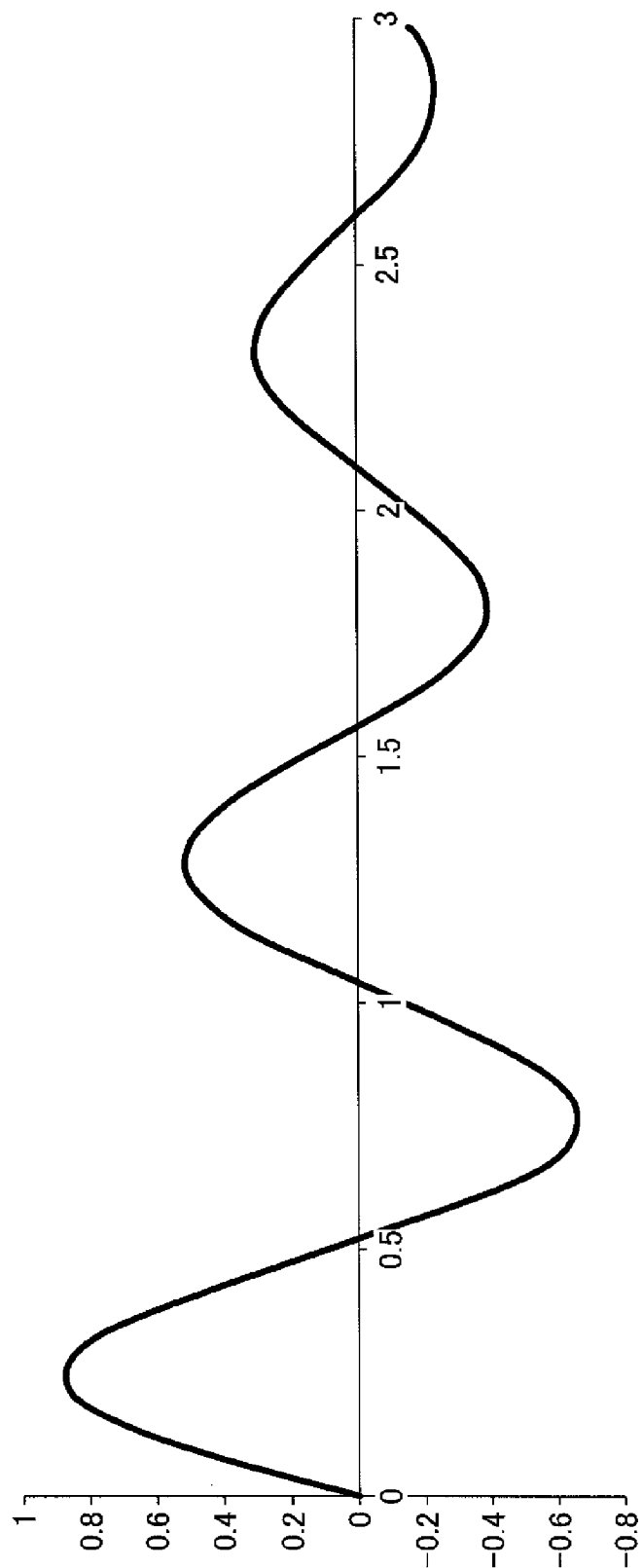
FIG. 13 is a graph indicating a voltage waveform of power generated by the power generator in a second power generation.

FIG. 13 illustrates a voltage waveform of the induced electromotive force output by the power generator 13 in the second power generation. In FIG. 13, the horizontal axis represents the time and the vertical axis represents the voltage. As described above, in the second power generation, the driven part 41 of the power generator 13 rotates in the clockwise direction in FIG. 11, and as a result, an induced electromotive force having a damped oscillatory waveform as illustrated in FIG. 13 is generated. That is, as the voltage waveform of the induced electromotive force generated in the second power generation, a positive electromotive force is first generated after which negative and positive electromotive forces are alternately generated.

In the following, comparisons are made with respect to the voltage waveform of the induced electromotive force output by the power generator 13 in the first power generation as illustrated in FIG. 12 and the voltage waveform of the induced electromotive force output by the power generator 13 in the second power generation as illustrated in FIG. 13. As can be appreciated, the voltage waveform of the induced electromotive force generated in the first power generation is different from the voltage waveform of the induced electromotive force generated in the second power generation. Specifically, there is a 90-degree phase difference between the voltage waveform of the first power generation and the voltage waveform of the second power generation.

This indicates that the power generator 13 generates electromotive forces having different characteristics depending on whether the first operation part 35A is operated to rotate the switch lever 12 in the A1 direction or the second operation part 35B is operated to rotate the switch lever 12 in the A2 direction. Thus, an operation may be identified as the first operation triggered by the operation of the first operation part 35A or the second operation triggered by the operation of the second operation part 35B by detecting the characteristics of the electromotive force generated by the power generator 13.

The circuit board 20 includes an identification circuit that identifies the first operation triggered by the operation of the first operation part 35A and the second operation triggered by the operation of the second operation part 35B based on the characteristics of the electromotive force generated by the power generator 13.

Thus, when the power generator 13 generates an induced electromotive force in the first power generation, the identification circuit determines whether the first operation part 35A or the second operation part 35B has been operated based on the characteristics of the electromotive force generated by the power generator 13, and the high frequency communication circuit arranged at the circuit board 20 transmits a corresponding switch signal (radio wave) to the electric appliance (not shown) according to the operation part 35A/35B that has been operated. In this way, the first operation (e.g., ON operation) or the second operation (e.g., OFF operation) may be implemented with respect to the electronic appliance.

According to an aspect of the present embodiment, because the first operation and the second operation may be identified based on the output of the power generator 13, a separate sensor for identifying the first operation and second operation does not have to be provided so that the configuration of the switch 1A maybe simplified (i.e., the number of components may be reduced) and manufacturing costs may be reduced.

It is noted that the state of the switch 1A illustrated in FIG. 11 is equivalent to the state before the first operation illustrated in FIG. 5. Thus, when the switch lever 12 is operated from the state illustrated in FIG. 11, the above-described operations of the switch 1A may be repeated.

Also, it is noted that in the above-described embodiment, the spring constants of the first power generation spring 14A and the second power generation spring 14B are arranged to be the same. However, in certain preferred embodiments, the spring constants of the first power generation spring 14A and the second power generation spring 14B may be arranged to vary.

In this case, the voltage waveform of the first power generation and the voltage waveform of the second power generation have a phase difference as well as an amplitude difference. Accordingly, the first operation and the second operation may be identified with greater accuracy, for example.

In the following, a second embodiment of the present invention is described.

FIGS. 14-17 illustrate configurations of a switch 1B and a power generation apparatus 10B according to the second embodiment. FIGS. 18-29 illustrate operations of the switch 1B and the power generation apparatus 10B of the second embodiment.

It is noted that in FIGS. 14-29, components and features that correspond to those illustrated in FIGS. 1-13 are given the same reference numerals and their descriptions are omitted.

Figure 14:
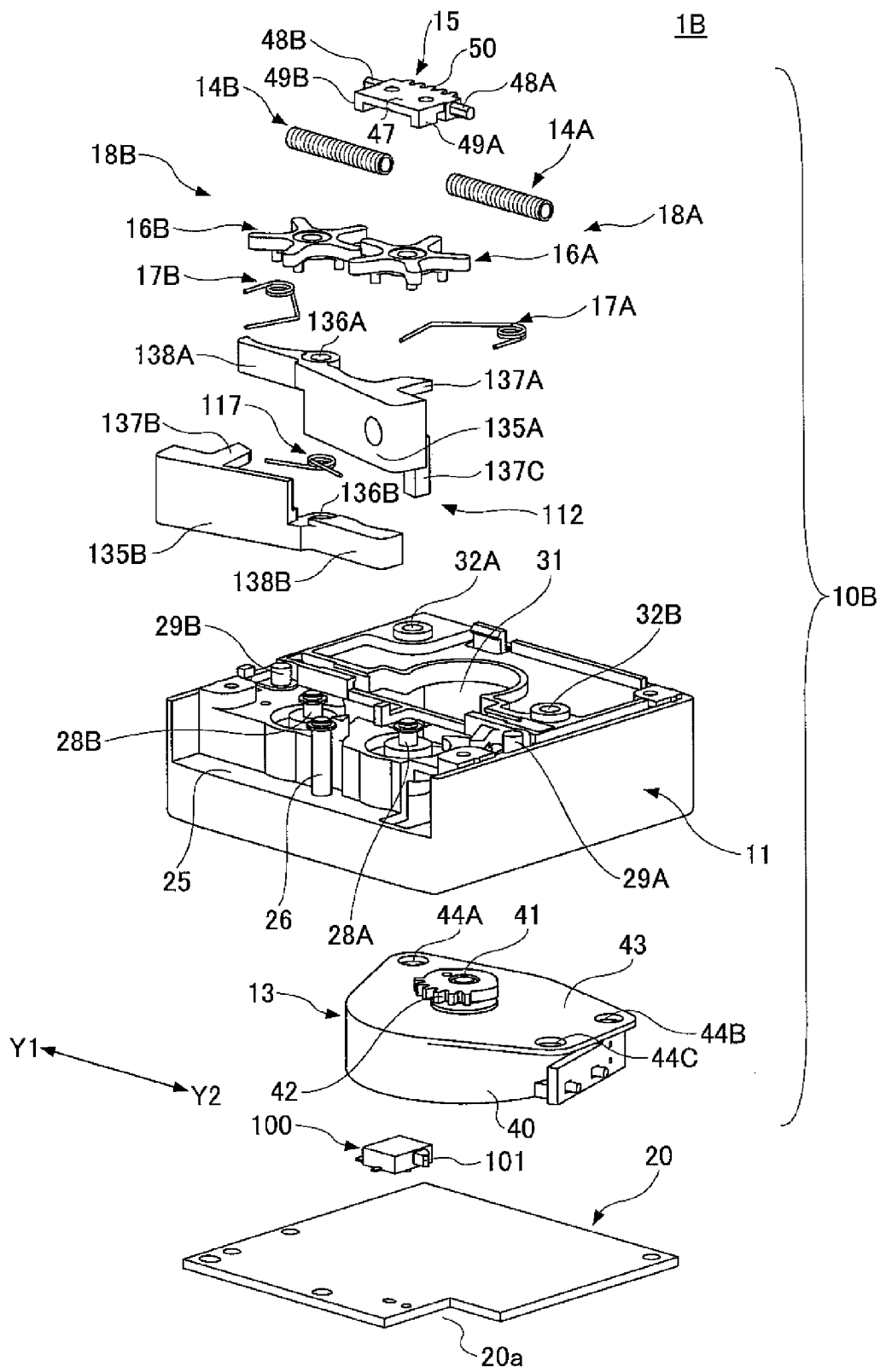
FIG. 14 is an exploded perspective view of a power generation apparatus and a switch according to a second embodiment of the present invention.
Figure 15:
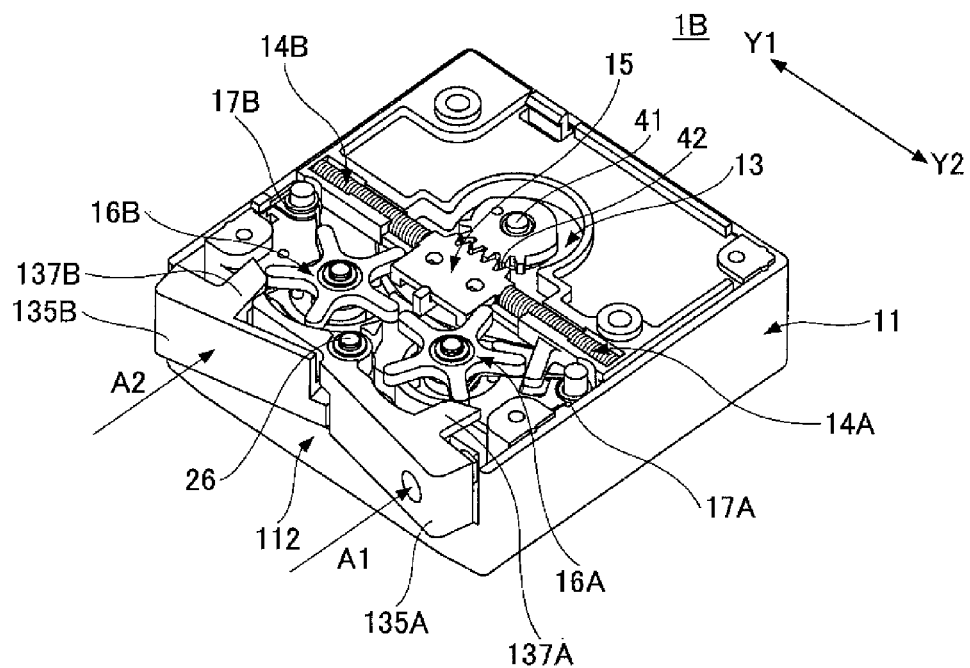
FIG. 15 is a perspective view of the power generation apparatus and switch of the second embodiment as seen from above.

As can be appreciated, the basic configurations of the switch 1B and the power generation apparatus 10B of the second embodiment are similar to those of the switch 1A and the power generation apparatus 10A of the first embodiment. However, as illustrated in FIG. 14, in the switch 1B and the power generation apparatus 10B of the second embodiment, a detection switch 100 is arranged at the circuit board 20, a switch lever 112 includes a first operation part 135A and a second operation part 135B that are separate components, and an arm part 137C is arranged at the first operation part 135A.

The detection switch 100 of the present embodiment is a micro switch that includes a switch knob 101. The detection switch 100 is configured to be turned ON/OFF in response to operations of the switch knob 101.

Figure 16:
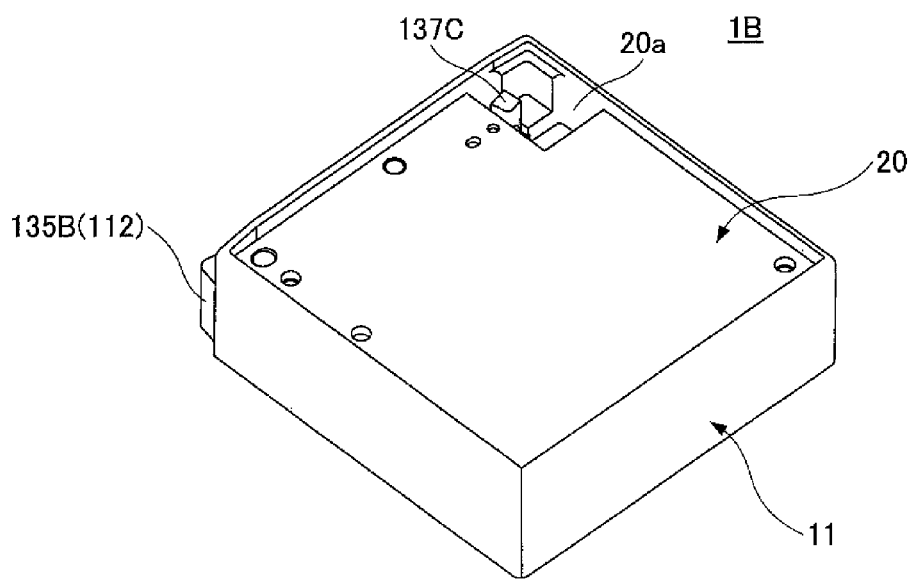
FIG. 16 is a perspective view of the power generation apparatus and switch of the second embodiment as seen from below.
Figure 17:
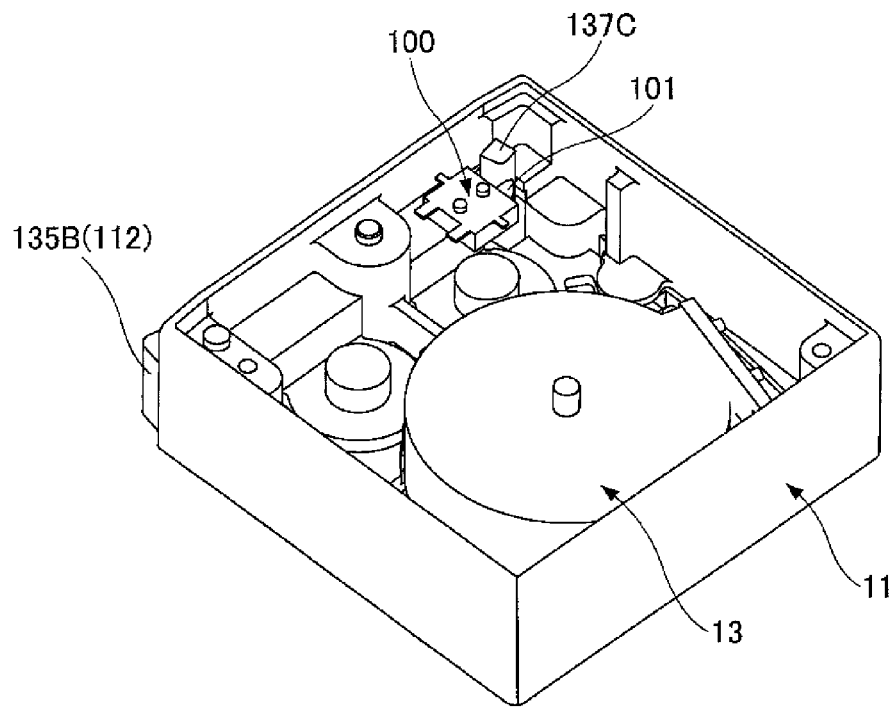
FIG. 17 is a perspective view of the power generation apparatus and switch of the second embodiment as seen from below with a substrate removed.

The detection switch 100 is arranged at the circuit board 20. As illustrated in FIGS. 14 and 16, the circuit board 20 has a cutout part 20a. The detection switch 100 is arranged at the circuit board 20 in a manner such that the switch knob 101 protrudes within a region of the cutout part 20a. It is noted that the detection switch 100 is not limited to a mechanical switch such as a micro switch. That is, various other types of detection units such as a capacitive sensor, an optical sensor, a resistive sensor, and the like may alternatively be used.

The switch lever 112 includes the first operation part 135A, the second operation part 1352, and a switch spring 117.

The first operation part 135A and the second operation part 135B are resin molded articles. The first operation part 135A includes a shaft hole 136A, a first engagement convex part 137A, the arm part 137C, and an extended part 138A that are integrally formed. The second operation part 135B includes a shaft hole 136B, a second engagement convex part 137B, and an extended part 138B that are integrally formed.

The first operation part 135A and the second operation part 135B are arranged to have their respective shaft holes 136A and 136B inserted through the spindle 26 to be axially supported by the spindle 26. When inserting the first operation part 135A and the second operation part 135B through the spindle 26, the switch spring 117 is arranged between the first operation part 135A and the second operation part 135B.

Figure 18:
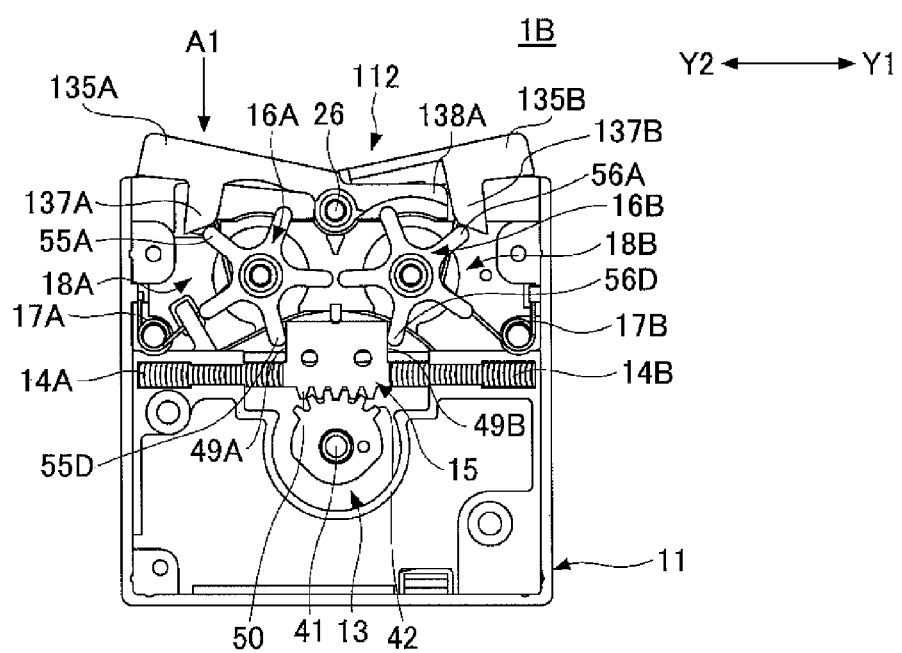
FIG. 18 is a plan view illustrating an operation of the power generation apparatus and switch of the second embodiment.

The switch spring 117 is configured to urge the first operation part 135A to rotate around the spindle 26 in the clockwise direction in FIG. 18 and urge the second operation part 135B to rotate around the spindle in the counterclockwise direction in FIG. 18. However, because the extended parts 138A and 138B of the first operation part 135A and the second operation part 135B are in engagement with the second operation part 135B and the first operation part 135A, respectively, the first operation part 135A and the second operation part 135B are restricted from rotating further from their positions illustrated in FIG. 18.

The arm part 137C is arranged to extend downward (toward the circuit board 20). The tip of the arm part 137C is arranged to be positioned within the region of the cutout part 20a formed at the circuit board 20, and the arm part 137C is arranged to face the switch knob 101 of the detection switch 100 (see FIG. 17).

It is noted that the configuration of the first engagement convex part 137A is the same as the configuration of the first engagement convex part 37A of the first embodiment, and the configuration of the second engagement convex part 137B is the same as the configuration of the second engagement convex part 373 of the first embodiment.

In the following, operations of the switch 13 and the power generation apparatus 10B are described.

FIGS. 18-29 illustrate operations of the switch 13 and the power generation apparatus 10B upon power generation. Specifically, FIGS. 18-25 illustrate operations of the switch 1B and the power generation apparatus 103 when the switch lever 112 is operated in the A1 direction, and FIGS. 26-29 illustrate operations of the switch 13 and the power generation apparatus 10B when the switch lever 112 is operated in the A2 direction. Also, FIGS. 18, 20, 22, 24, 26, and 28 are plan views of the switch 1B and the power generation apparatus 10B; and FIGS. 19, 21, 23, 25, 27, and 29 are bottom views of the switch 13 and the power generation apparatus 10B with the circuit board 20 removed.

Figure 19:
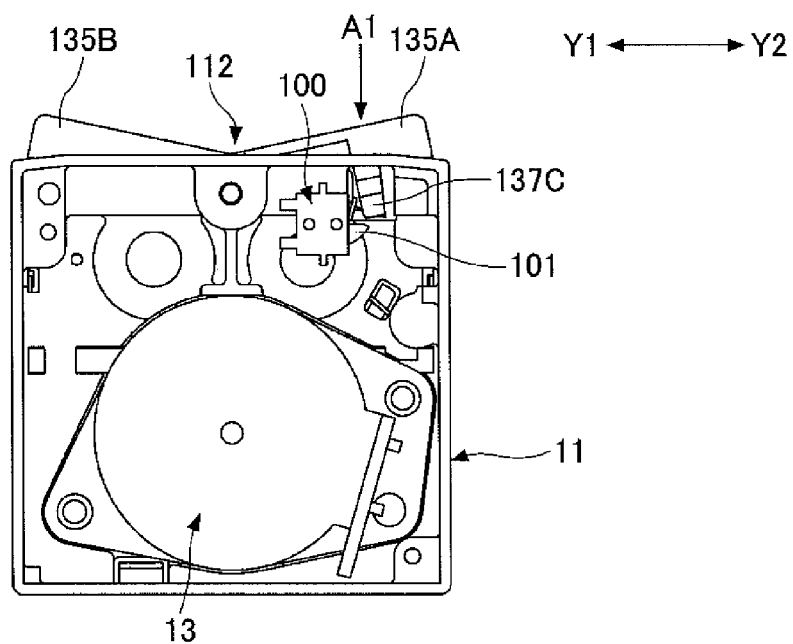
FIG. 19 is a plan view illustrating an operation of the power generation apparatus and switch of the second embodiment.

First, referring to FIGS. 18-25, the operations of various elements when the switch lever 112 is operated in the A1 direction are described. FIGS. 18 and 19 illustrate a state before the first operation part 135A (switch lever 112) is operated in the A1 direction (referred to as "state before first operation" hereinafter).

In the state before the first operation, the engagement protrusion 55A of the first pinwheel 16A of the first connection release mechanism 18A is in engagement with the first engagement convex part 137A, and the engagement protrusion 55D is in engagement with the first engagement part 49A of the slide member 15. Thus, the first operation part 135A (switch lever 112) and the second power generation spring 14B are interconnected via the first connection release mechanism 18A and the slide member 15.

Also, in the state before the first operation, the first and second power generation springs 14A and 14B are elongated so that elastic forces are not accumulated at the first and second power generation springs 14A and 14B at this stage. Thus, the slide member 15 is positioned approximately at a center position (referred to as "pre-operation position" hereinafter) of its movement range.

Further, as illustrated in FIG. 19, in the state before the first operation, the arm part 137C of the first operation part 135A is distanced away from the switch knob 101 of the detection switch 100. Thus, the detection switch 100 is turned OFF at this stage.

Figure 20:
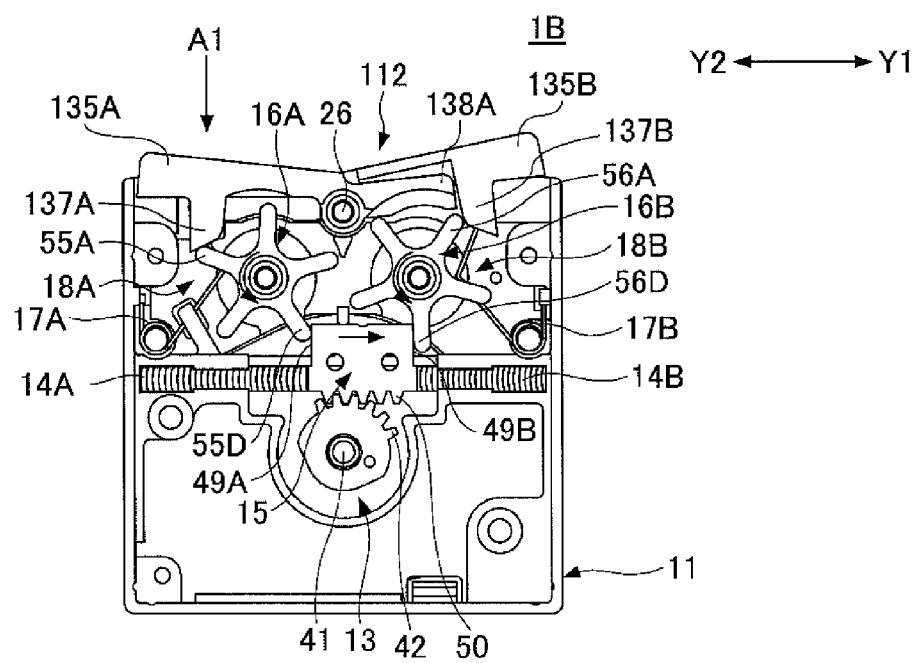
FIG. 20 is a plan view illustrating an operation of the power generation apparatus and switch of the second embodiment.
Figure 21:
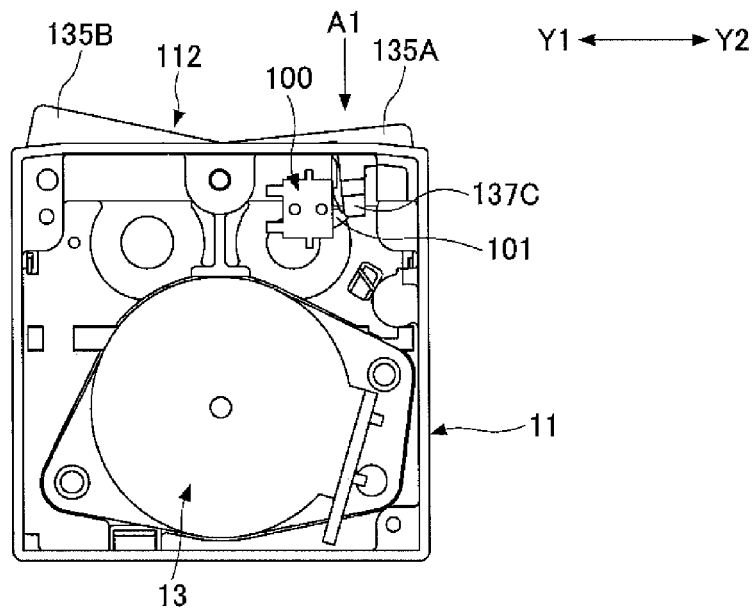
FIG. 21 is a plan view illustrating an operation of the power generation apparatus and switch of the second embodiment.

FIGS. 20 and 21 illustrate a state of the switch 1B when operation of the first operation part 135A in the A1 direction is started.

With this operation, the first operation part 135A rotates around the spindle 26. However, as described above, because the second operation part 135B is separated from the first operation part 135A, the second operation part 135B does not rotate along with the rotation of the first operation part 135A. That is, the position of the second operation part 135B remains the same as that before the first operation.

When the first operation part 135A is operated in the A1 direction, the first engagement convex part 137A pushes the engagement protrusion 55A. When the engagement protrusion 55A is pushed by the first engagement convex part 137A, the first pinwheel 16A rotates in the counterclockwise direction.

In response to such rotation, the engagement protrusion 55D also rotates so that the first engagement part 49, which is in engagement with the engagement protrusion 55D, is urged to move in the Y1 direction. In this way, the slide member 15 starts moving toward the Y1 direction from the pre-operation position so that the second power generation spring 14B is compressed to thereby accumulate elastic force.

Also, as the switch lever 112 is operated in the A1 direction, the arm part 137C moves closer to the switch knob 101 of the detection switch 100. However, as illustrated in FIG. 21, at the time movement of the first operation part 135A toward the A1 direction has just started, the switch knob 101 is not yet pushed by the arm part 137C. Thus, the detection switch 100 is still turned OFF at this stage.

Figure 22:
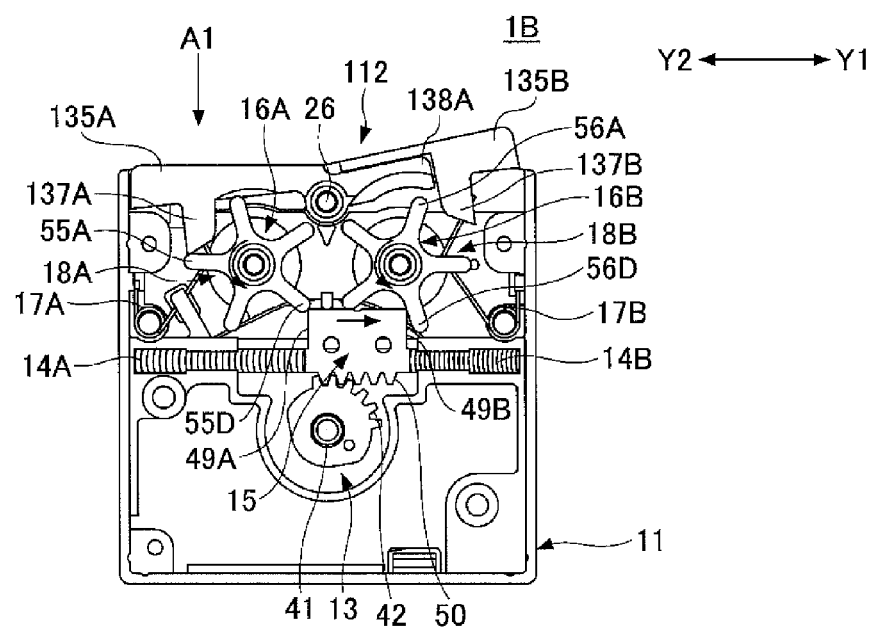
FIG. 22 is a plan view illustrating an operation of the power generation apparatus and switch of the second embodiment.
Figure 23:
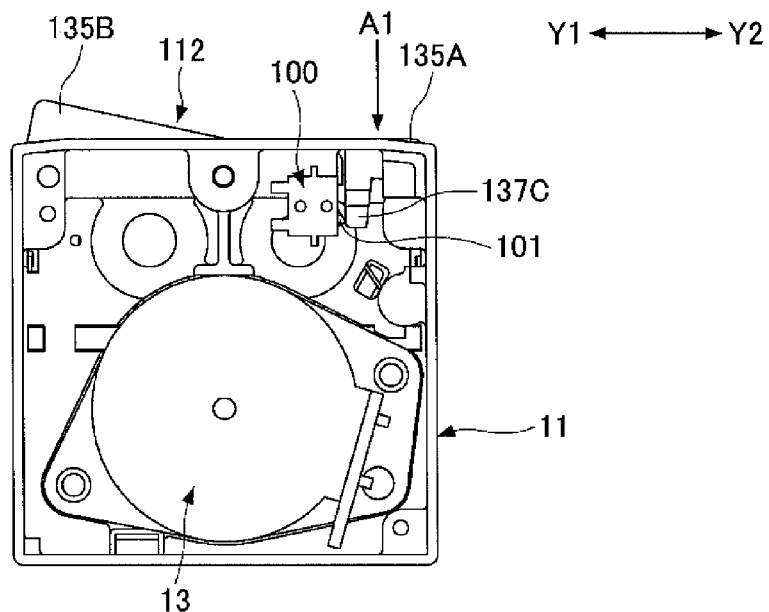
FIG. 23 is a plan view illustrating an operation of the power generation apparatus and switch of the second embodiment.

FIGS. 22 and 23 illustrate a state of the switch 1B when the first operation part 135A has been operated to reach a position at which the second power generation spring 14B accumulates sufficient elastic force for driving the power generator 13 (such position of the first operation part 135A being referred to as "first accumulation completed position" and such state of the switch 1B being referred to as "first accumulation completed state" hereinafter).

In the first accumulation completed state, the first operation part 135A (first engagement convex part 137A) is thrust in the A1 direction and the slide member 15 is disposed at a Y1 direction limit position of its movement range. Also, the engagement protrusion 55D of the first pinwheel 16A is in engagement with the engagement part 49A but is on the verge of disengaging from the first engagement part 49A.

Further, as illustrated in FIG. 23, in the first accumulation completed state, the arm part 137C pushes the switch knob 101 of the detection switch 100 downward. Thus, in the first accumulation completed state, the detection switch 100 is turned ON. However, because power generation by the power generator 13 has not yet started, power is not yet supplied to the detection switch 100 so that a detection signal is not output at this stage.

When the first operation part 135A is thrust further in the A1 direction from the first accumulation completed position, the engagement protrusion 55D disengages from the first engagement part 49A. In this way, the elastic force (elastic energy) accumulated at the second power generation spring 14B is applied to the slide member 15 so that the slide member 15 instantaneously moves in the Y2 direction.

Figure 24:
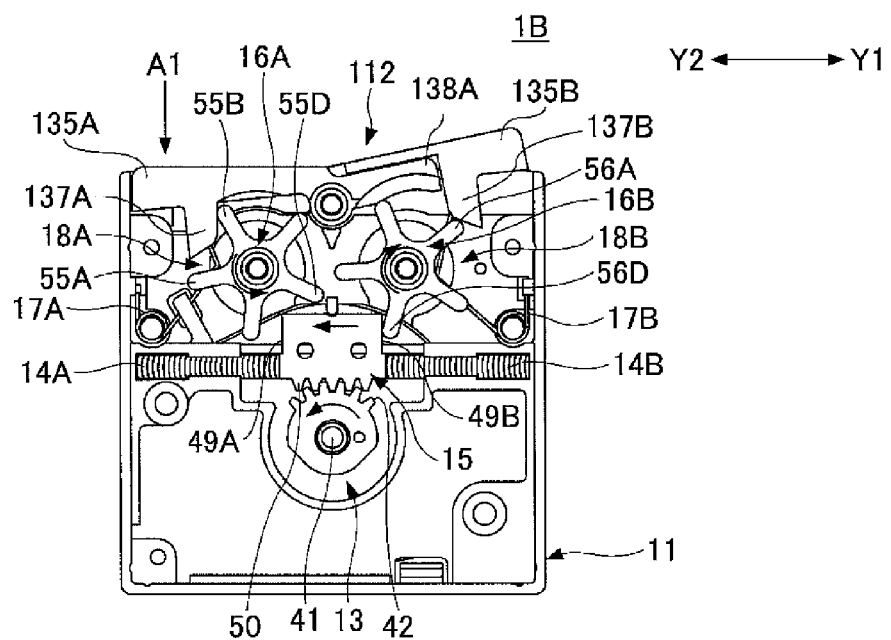
FIG. 24 is a plan view illustrating an operation of the power generation apparatus and switch of the second embodiment.
Figure 25:
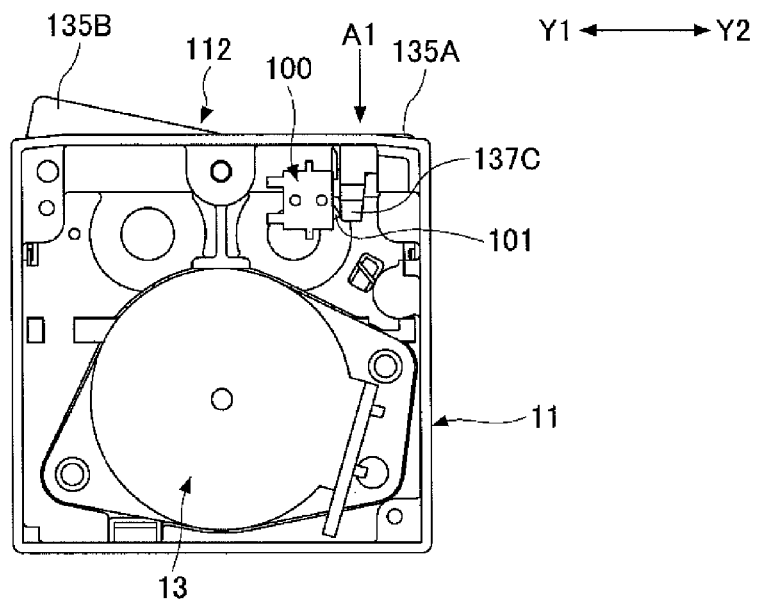
FIG. 25 is a plan view illustrating an operation of the power generation apparatus and switch of the second embodiment.

As described above, the gear 42 is in engagement with the rack 50. Thus, when the slide member 15 instantaneously slides in the Y2 direction, the driven part 41 is rotated in the counterclockwise direction. In this way, the power generator 13 generates an induced electromotive force (generates power) in response to the elastic force output by the second power generation spring 14B. FIGS. 24 and 25 illustrate a state of the switch 1B when the slide member 15 has moved to the Y2 direction.

When the power generator 13 generates power in the manner described above, power is supplied to the detection switch 100. Because the detection switch is turned ON as described above, the detection switch 100 outputs a detection signal upon receiving the power supply.

Next, referring to FIGS. 26-29, operations of various elements when the second operation part 135B is operated in the A2 direction are described.

It is noted that operations triggered when the second operation part 135B is operated in the A2 direction from the state before the first operation as illustrated in FIGS. 18 and 19 are symmetrical to the above-described operations that are triggered when the first operation part 135A is operated in the A1 direction.

Figure 26:
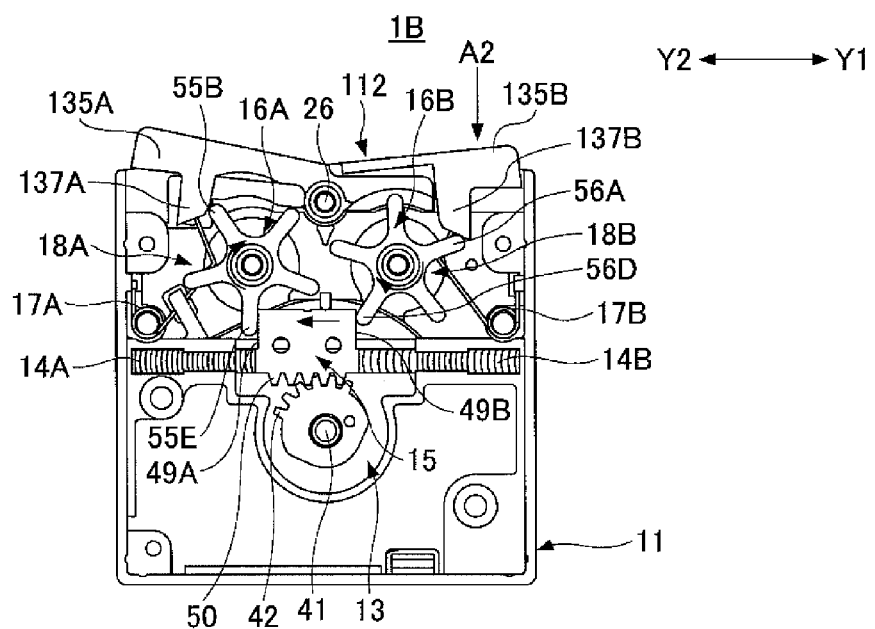
FIG. 26 is a plan view illustrating an operation of the power generation apparatus and switch of the second embodiment.
Figure 27:
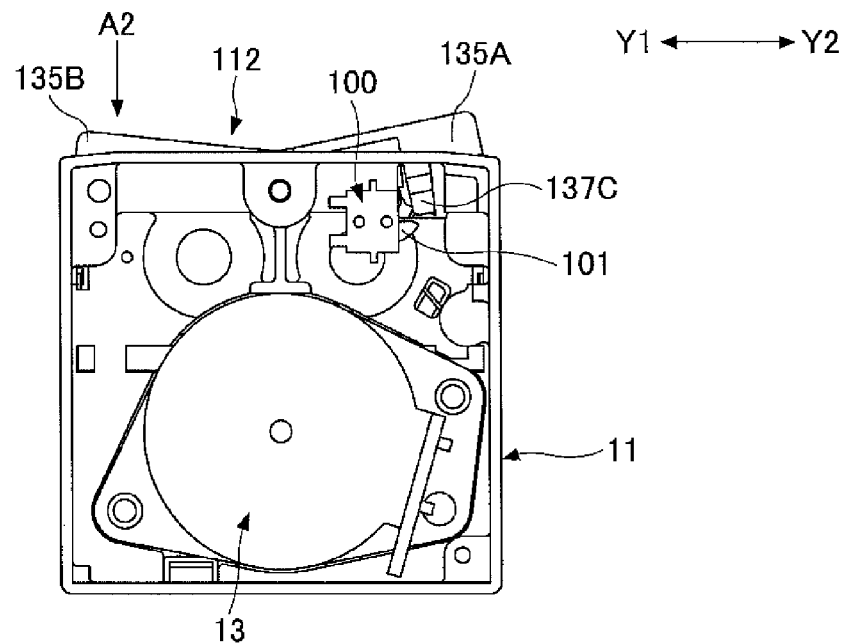
FIG. 27 is a plan view illustrating an operation of the power generation apparatus and switch of the second embodiment.

FIGS. 26-27 illustrate a state of the switch 1B when the second operation part 1352 is operated in the A2 direction. With this operation, the second engagement convex part 137B pushes the engagement protrusion 56A, the second pinwheel 16B rotates in the clockwise direction, and the slide member 15 moves in the Y2 direction from the pre-operation position via the engagement protrusion 56D. In this way, the first power generation spring 14A is compressed to thereby accumulate elastic force.

When the second operation part 135B is pushed further in the A2 direction from its position illustrated in FIGS. 26 and 27, the engagement protrusion 56D disengages from the second engagement part 49B so that the connection between the switch lever 112 and the first power generation spring 14A is released.

Figure 28:
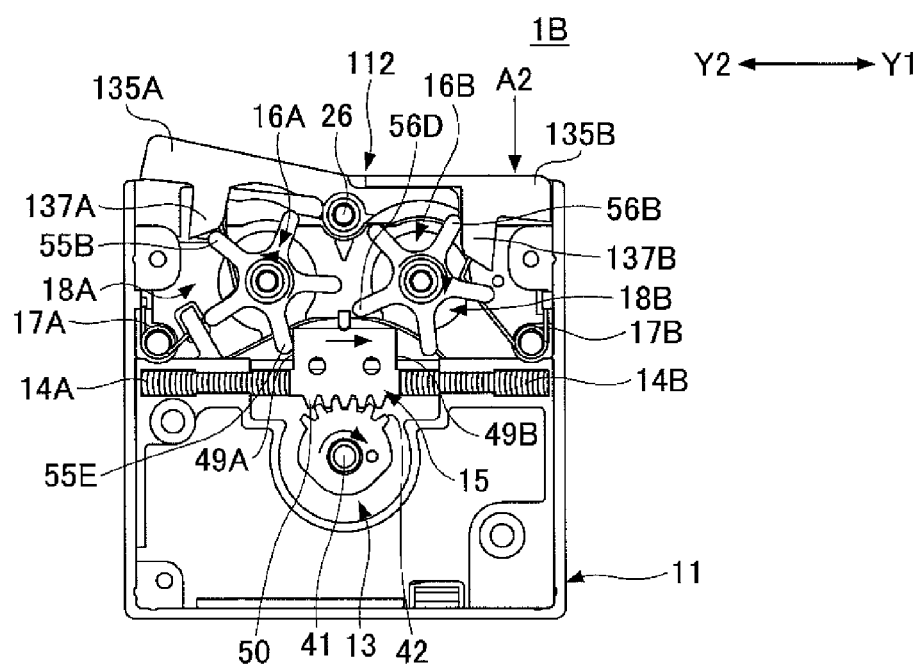
FIG. 28 is a plan view illustrating an operation of the power generation apparatus and switch of the second embodiment.
Figure 29:
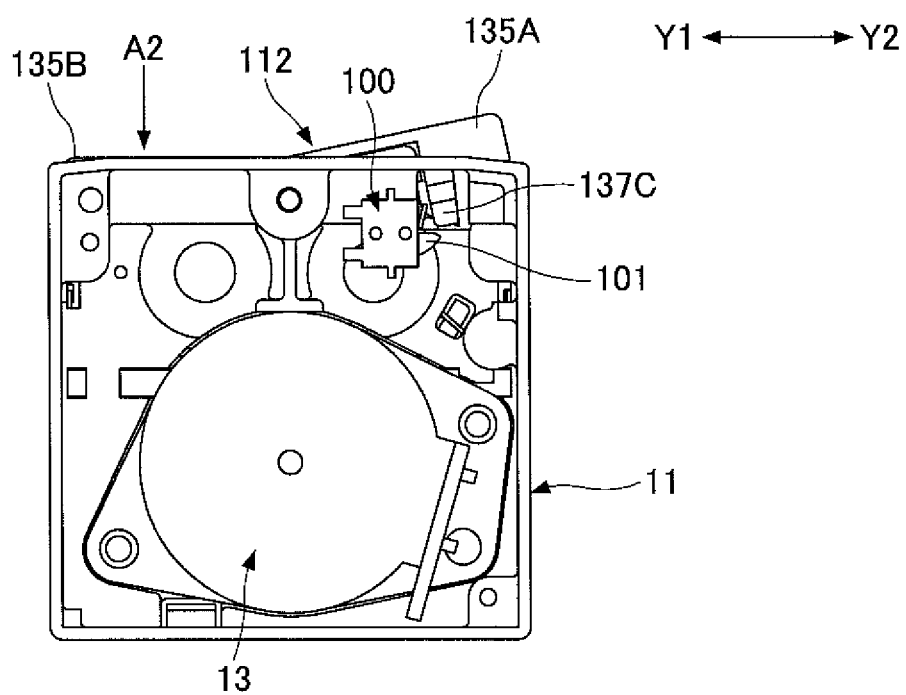
FIG. 29 is a plan view illustrating an operation of the power generation apparatus and switch of the second embodiment.

In this way, the elastic force (elastic energy) accumulated at the first power generation spring 14A is applied to the slide member 15 so that the slide member 15 instantaneously moves in the Y1 direction and the driven part 41 rotates in the clockwise direction. Thus, the power generator 13 generates an induced electromotive force (generates power) in response to the elastic force output by the first power generation spring 14A. FIGS. 28 and 29 illustrate a state of the switch 1B right after the slide member 15 has moved in the Y1 direction.

In the following, operations of the arm part 137C and the detection switch 100 when the second operation part 135B is operated in the A2 direction are described. As described above, the arm part 137C is integrally formed with the first operation part 135A, which is separated from the second operation part 135B. Thus, even when the second operation part 135B is operated, the arm part 137C does not move and remains disengaged from the switch knob 101. That is, while the second operation part 135B is operated in the A2 direction, the detection switch 100 is turned OFF.

The identification circuit of the present embodiment identifies an operation as the first operation triggered by the operation of the first operation part 135A or the second operation triggered by the operation of the second operation part 135B based on the electromotive force generated by the power generator 13 and the detection result of the detection switch 100.

Specifically, when the power generator 13 generates an electromotive force and the detection switch 100 is turned ON, the identification circuit determines that the first operation has been implemented (i.e., the first operation part 135A has been operated). When the power generator 13 generates an electromotive force and the detection switch 100 is turned OFF, the identification circuit determines that the second operation has been implemented (i.e., the second operation part 135B has been operated).

Based on the identification result of the identification circuit, the high frequency circuit arranged at the circuit board 20 transmits a corresponding switch signal (radio wave) to an electrical appliance according to the operation part 135A/135B that has been operated. In this way, the first operation (e.g., ON operation) or the second operation (e.g., OFF operation) may be implemented with respect to the electrical appliance.

According to an aspect of the present embodiment, by using the output of the power generator 13 to identify an operation as a first operation or a second operation, two operations may be identified using one detection switch 100. That is, a detection switch does not have to be provided for each operation so that the switch 1B of the present embodiment may have a simplified configuration (a reduced number of components) and may be manufactured at a lower cost, for example.

Although the present invention has been described above in connection with certain illustrative embodiments, the present invention is not limited to the embodiments described above, and numerous variations and modifications may be made without departing from the scope of the present invention.

The present application is based on and claims the benefit of priority of Japanese Patent Application No. 2011-004087 filed on Jan. 12, 2011, the entire contents of which are herein incorporated by reference.

The invention claimed is:

1. A power generation apparatus comprising:
a case;
an operation member including a first operation part and a second operation part, the operation member being configured to have one of the first operation part or the second operation part operated upon power generation;
a power generation part that generates an induced electromotive force when a driven part is driven;
a slide member that is arranged at the case and is movable in a first direction and a second direction, which is different from the first direction, the slide member being configured to drive the driven part by moving in at least one of the first direction and the second direction;
a first elastic unit and a second elastic unit that are configured to accumulate an elastic force upon application of an external force, output the accumulated elastic force, and urge the slide member to move;
a first connection release mechanism that prompts the first elastic unit to accumulate the elastic force by prompting the slide member to move in the first direction when the first operation part of the operation member is operated, releases a connection between the operation member and the slide member when the operation member passes a first accumulation completed position, and allows the first elastic unit to output the accumulated elastic force to prompt the slide member to move in the second direction; and
a second connection release mechanism that prompts the second elastic unit to accumulate the elastic force by prompting the slide member to move in the second direction when the second operation part of the operation member is operated, releases the connection between the operation member and the slide member when the operation member passes a second accumulation completed position, and allows the second elastic unit to output the accumulated elastic force to prompt the slide member to move in the first direction.

2. The power generation apparatus as claimed in claim 1, wherein
each of the first connection release mechanism and the second connection release mechanism is rotatably mounted to the case and includes a pinwheel having a plurality of engagement protrusions that extend in a radial direction, the engagement protrusions being configured to be engageable with the operation member and the slide member through rotation of the pinwheel.

3. The power generation apparatus as claimed in claim 1, further comprising:
a gear that is arranged at the driven part; and
a rack that is arranged at the slide member and is configured to engage the gear.

4. A switch comprising:
the power generation apparatus as claimed in claim 1;
an identification circuit that identifies which one of the first operation part and the second operation part has been operated based on a characteristic of the induced electromotive force generated by the power generation apparatus; and
a communication circuit that is activated by the induced electromotive force generated by the power generation apparatus and is configured to transmit a switch signal based on an identification result of the identification circuit.

5. The power generation apparatus as claimed in claim 1, further comprising:
one detection unit that is configured to engage the first operation part or the second operation part that has been operated and output a detection signal when one of the first operation part or the second operation part is operated.

6. A switch comprising:
the power generation apparatus as claimed in claim 5;
an identification circuit that identifies which one of the first operation part and the second operation part has been operated based on a detection result of the detection unit and the induced electromotive force generated by the power generation apparatus; and a communication circuit that is activated by the induced electromotive force generated by the power generation apparatus and is configured to transmit a switch signal based on an identification result of the identification circuit.

* * * * *